United States Patent
Williams

(10) Patent No.: US 6,465,383 B2
(45) Date of Patent: Oct. 15, 2002

(54) PROCATALYSTS, CATALYST SYSTEMS, AND USE IN OLEFIN POLYMERIZATION

(75) Inventor: Darryl Stephen Williams, Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/753,699

(22) Filed: Jan. 3, 2001

(65) Prior Publication Data

US 2001/0031841 A1 Oct. 18, 2001

Related U.S. Application Data

(63) Continuation-in-part of application No. 09/481,629, filed on Jan. 12, 2000, now abandoned.

(51) Int. Cl.$^7$ ............................. B01J 31/02; B01J 31/38; C08F 2/00
(52) U.S. Cl. ..................... 502/103; 502/104; 502/117; 502/155; 502/156; 526/89; 526/154; 526/348
(58) Field of Search ........................ 526/89, 155, 158, 526/161, 172, 348.6; 502/103, 104, 117, 118, 155, 156

(56) References Cited

U.S. PATENT DOCUMENTS

| | | |
|---|---|---|
| 2,981,725 A | 4/1961 | Luft et al. |
| 3,113,115 A | 12/1963 | Ziegler et al. |
| 3,313,791 A | 4/1967 | Price et al. |
| 3,318,858 A | 5/1967 | Nakaguchi et al. |
| 3,489,736 A | 1/1970 | Takahashi et al. |
| 3,534,006 A | 10/1970 | Kamaishi et al. |
| 3,594,330 A | 7/1971 | Delbouille et al. |
| 3,634,384 A | 1/1972 | Susa et al. |
| 3,637,897 A | 1/1972 | Cull et al. |
| 3,644,318 A | 2/1972 | Diedrich et al. |
| 3,652,705 A | 3/1972 | Takashi et al. |
| 3,655,812 A | 4/1972 | Langer, Jr. et al. |
| 3,676,415 A | 7/1972 | Diedrich et al. |
| 3,709,853 A | 1/1973 | Karapinka |
| 3,714,133 A * | 1/1973 | Kawasaki et al. .......... 524/365 |
| 3,723,348 A | 3/1973 | Apotheker |
| 3,737,416 A | 6/1973 | Hayashi et al. |
| 3,737,417 A | 6/1973 | Hayashi et al. |
| 3,781,318 A | 12/1973 | Corbellini et al. |
| 3,786,032 A | 1/1974 | Jennings et al. |
| 3,862,257 A | 1/1975 | Buben et al. |
| 3,883,493 A | 5/1975 | Yamao et al. |
| 3,884,988 A | 5/1975 | Girotti et al. |
| 3,917,575 A | 11/1975 | Matsuura et al. |
| 3,919,180 A | 11/1975 | Furukawa et al. |
| 3,948,869 A | 4/1976 | Halasa et al. |
| 4,003,712 A | 1/1977 | Miller |
| 4,011,382 A | 3/1977 | Levine et al. |
| 4,012,573 A | 3/1977 | Trieschmann et al. |
| 4,076,698 A | 2/1978 | Anderson et al. |
| 4,105,847 A | 8/1978 | Ito et al. |
| 4,129,702 A | 12/1978 | Roberts et al. |
| 4,148,754 A | 4/1979 | Strobel et al. |
| 4,195,069 A | 3/1980 | Kortbeek et al. |
| 4,256,866 A | 3/1981 | Karayannis et al. |
| 4,298,713 A | 11/1981 | Morita et al. |
| 4,302,566 A | 11/1981 | Karol et al. |
| 4,311,752 A | 1/1982 | Diedrich et al. |
| 4,319,010 A | 3/1982 | van den Berg |
| 4,363,904 A | 12/1982 | Fraser et al. |
| 4,366,297 A | 12/1982 | Makino et al. |
| 4,409,126 A | 10/1983 | Shipley et al. |
| 4,426,315 A | 1/1984 | Bahadir et al. |
| 4,451,626 A | 5/1984 | Shipley et al. |
| 4,478,989 A | 10/1984 | Goodall et al. |
| 4,481,301 A | 11/1984 | Nowlin et al. |
| 4,482,639 A | 11/1984 | Desmond et al. |
| 4,540,756 A | 9/1985 | Johnson |
| 4,543,399 A | 9/1985 | Jenkins, III et al. |
| 4,601,994 A | 7/1986 | Coleman, III |
| 4,603,185 A | 7/1986 | Benton et al. |
| 4,721,762 A | 1/1988 | Commereuc et al. |
| 4,727,123 A | 2/1988 | Weinert, Jr. et al. |
| 4,882,400 A | 11/1989 | Dumain et al. |
| 5,021,595 A | 6/1991 | Datta |
| 5,037,997 A | 8/1991 | Zhukov et al. |
| 5,039,766 A | 8/1991 | Sasaki et al. |
| RE33,683 E | 9/1991 | Allen et al. |
| 5,134,104 A | 7/1992 | Sasaki et al. |
| 5,320,994 A | 6/1994 | Bujadoux et al. |
| 5,352,749 A | 10/1994 | DeChellis et al. |
| 5,378,778 A | 1/1995 | Johoji et al. |
| 5,420,090 A | 5/1995 | Spencer et al. |
| 5,468,707 A | 11/1995 | Pohl et al. |
| 5,541,270 A | 7/1996 | Chinh et al. |
| 5,587,440 A | 12/1996 | Ehlers et al. |
| 5,728,641 A | 3/1998 | Aida et al. |
| 5,756,610 A | 5/1998 | Tsai et al. |
| 5,777,120 A | 7/1998 | Jordan et al. |
| 5,840,646 A | 11/1998 | Katayama et al. |

FOREIGN PATENT DOCUMENTS

| | | |
|---|---|---|
| BE | 839380 | 9/1976 |
| CA | 991798 | 6/1976 |

OTHER PUBLICATIONS

Adema, E. H., *Journal of Polymer Science*, Part C, 1968, pp. 3643–3654, vol. 16.

(List continued on next page.)

*Primary Examiner*—David W. Wu
*Assistant Examiner*—R. Harlan
(74) *Attorney, Agent, or Firm*—Bernard J. Graves, Jr.; Jonathan D. Wood

(57) ABSTRACT

There are described solid procatalysts, catalyst systems incorporating the solid procatalysts, and the use of the catalyst systems in olefin polymerization and interpolymerization.

3 Claims, No Drawings

OTHER PUBLICATIONS

Chien, J. C., et al., *Journal of Polymer Science*, Polymer Chemistry Edition, 1982, pp. 2019–2032, vol. 20.
Chien, J. C., et al., *Journal of Polymer Science*, Polymer Chemistry Edition, 1982, pp. 2461–2476, vol. 20.
Cavallo, L, et al., *Journal of the American Chemical Society*, 1998, pp. 2428–2436, vol. 120.
Kissin, Y., et al., *Topics in Catalysis*, 1999, pp. 69–88.
Kissin, Y., *Journal of Polymer Science*, Part A: Polymer Chemistry, 1995, pp. 227–237, vol. 33.
Kissin, Y., *Makromolecular Chemistry, Macromolecular Symposium*, 1993, pp. 83–93, vol. 66.
Arlman, E. J., et al., *Journal of Catalysis*, 1964, pp. 99–104, vol. 3.
Cossee, P., *Journal of Catalysis*, 1964, pp. 80–88, vol. 3.
Arlman, E., *Proceedings of the Third International Congress on Catalysis*, 1964, pp. 957–965, 3$^{rd}$ Edition.
Brookhart, M., et al., *Journal of Organometallic Chemistry*, 1983, pp. 395–408, vol. 250.
Britovsek, G., et al., *Angewandte Chemie Int. Ed.*, 1999, pp. 428–447, vol. 38.
Margl, P., et al., *Topics in Catalysis*, 1999, pp. 187–208, vol. 7.
Ziegler, T., et al., *Book of Abstracts: 217$^{th}$ ACS National Meeting* Anaheim, Calif., Mar. 21–25, 1999, pp. CATL–027.
Woo, T., et al., *Organometallics*, 1994, pp. 2252–2261, vol. 13.
Nedorezova, P., et al., *Vysokomolekulyarnym Soyedineniyam*, Ser. A, 1974, pp. 762–767, vol. 16.
Watt, W., et al., *Journal of Polymer Science*, Part A–1, 1968, pp. 2703–2713, vol. 6.
Soga, K., et al., *Journal of Polymer Science*, Part A: Polymer Chemistry, 1997, pp. 823–826, vol. 35.
Sorlie, M., et al., *Inorganic Chemistry*. 1981, pp. 1384–1390, vol. 20.
Sorlie, M., et al., *Inorganic Chemistry*, 1978, pp. 2473–2484, vol. 17.
Coles, S., et al., *Journal of Organometallic Chemistry*, 1999, pp. 304–312, vol. 580.
Wilkie, C., et al., *Inorganic Syntheses*, 1979, pp. 145–149, vol. 19.
*Chemical & Engineering News*, 1985, p. 27, vol. 63.
Database WPI, Section Ch, Week 198531, 1985, Derwent Publications Ltd., London, GB; AN 1985–186015, XP002164756 (JP 60 112803 A).

* cited by examiner

PROCATALYSTS, CATALYST SYSTEMS, AND USE IN OLEFIN POLYMERIZATION

CROSS-REFERENCE TO RELATED APPLICATIONS

This is a continuation-in-part application of application Ser. No. 09/481,629 filed on Jan. 12, 2000, now abandoned, the entire contents of which are hereby incorporated by reference.

FIELD OF THE INVENTION

This invention belongs to the field of organometallic chemistry. In particular, this invention relates to certain novel supported organometallic solid procatalysts and catalyst systems particularly useful for olefin polymerization or interpolymerization.

BACKGROUND OF THE INVENTION

A particularly useful polymerization medium for producing polyethylene polymers is a gas phase process. Examples of such are given in U.S. Pat. Nos. 3,709,853; 4,003,712; 4,011,382; 4,302,566; 4,543,399; 4,882,400; 5,352,749 and 5,541,270 and Canadian Patent No. 991,798 and Belgian Patent No. 839,380.

Ziegler-Natta type catalyst systems for the polymerization of olefins are well known in the art and have been known at least since the issuance of U.S. Pat. No. 3,113,115. Thereafter, many patents have been issued relating to new or improved Ziegler-Natta type catalysts. Examples of such patents are U.S. Pat. Nos. 3,594,330; 3,676,415; 3,644,318; 3,917,575; 4,105,847; 4,148,754; 4,256,866; 4,298,713; 4,311,752; 4,363,904; 4,481,301 and Reissue 33,683.

These patents disclose Ziegler-Natta type catalysts (referred to herein as ZNCs) that are well known as typically consisting of a catalyst system comprising a transition metal-containing procatalyst, which typically contains titanium, and an organometallic cocatalyst, typically an organoaluminum compound. Optionally used with the catalyst are activators such as halogenated hydrocarbons and activity modifiers such as electron donors.

In the earliest patents involving 'Ziegler-Natta' catalysts for olefin polymerization, titanium halides are treated with metal alkyls in order to provide a reduced solid, consisting primarily of $TiCl_3$ and typically admixed with the by-products of the reaction. In these systems, a solid which is primarily $TiCl_3$ is formed which is used as the procatalyst for the polymerization of olefins. There are several families of patents describing the generation of solid $TiCl_3$.

Soluble Ziegler-Natta catalysts have also been described. U.S. Pat. No. 4,366,297 describes a process in which an ether adduct of $TiCl_4$ is treated with a reducing agent to afford a soluble $TiCl_3$ species, suggesting further that a precipitate forms in the absence of the ether. U.S. Pat. No. 3,862,257 describes hydrocarbon solutions of $TiRCl_3 \cdot AlCl_3$ from which $AlCl_3$ is removed by addition of a modifier, in order to provide low molecular weight waxes in a solution process. U.S. Pat. No. 4,319,010 describes a solution process for olefin polymerization above 110° C. using a soluble catalyst formulation comprising reacting a titanium (IV) compound with the reaction product of a magnesium compound solubilized by an aluminum alkyl, while U.S. Pat. No. 4,540,756 demonstrates the activity of the reaction product of an alkylaluminum activator with a tetravalent transition metal salt solubilized by a magnesium carboxylate, specifically referring to $TiCl_4$. U.S. Pat. No. 5,037,997 describes an ethylene dimerization catalyst formed from the reaction of $Ti(OR)_4 + AlR_3 + MgR_2$ which has activity of less than 10 Kg/g Ti·h. U.S. Pat. Nos. 5,039,766 and 5,134,104 describe soluble titanium amido catalysts which are reacted with an aluminum alkyl activator or alumoxane in the presence of the substrate olefin.

Several patents describe supporting otherwise soluble catalysts. U.S. Pat. No. 3,634,384 describes generation of soluble titanium halide/ aluminum alkyl species at low temperatures to which is added a hydroxylated solid support which forms Mg—O—Ti covalent bonds. U.S. Pat. No. 3,655,812 describes a similar procedure by generating a reduced titanium species in an arene solvent and adding a magnesium halide support to increase activity. U.S. Pat. No. 4,409,126 describes a hydrocarbon soluble reaction product obtained by reacting an alkoxide-containing transition metal compound with an organometallic compound which is useful in the preparation of catalysts for polymerizing olefins. A variation of this is described in U.S. Pat. No. 5,320,994 wherein a titanium alkoxide is reacted with an aluminum alkyl, followed by addition of a magnesium compound which forms $MgCl_2$ under the reaction conditions. This case further specifies the importance of an $\alpha, \omega$-dihaloalkane in preventing over-reduction to $TiCl_2$.

U.S. Pat. No. 2,981,725 teaches the reaction of $TiCl_4$ with various supports, e.g. silicon carbide, followed by treatment $AlEt_2Cl$ as a cocatalyst. The supported catalyst shows an improvement of less than a factor of two over the unsupported precipitated catalyst. U.S. Pat. No. 4,426,315 describes generation of a similar supported catalyst in which the titanium and aluminum compounds are added simultaneously to a slurry of a carrier, with any reaction occurring only in the presence of said carrier.

Certain soluble or "liquid" Ziegler-Natta catalyst systems are known which utilize titanium chelates. For example, U.S. Pat. Nos. 3,737,416 and 3,737,417 describe the reaction of titanium chelates with halogenating agents followed by activation with aluminum alkyls to provide catalysts which copolymerize $\alpha$-olefins and butadiene. These activations are carried out at temperatures as low as –78° C. in the presence of monomer. U.S. Pat. No. 3,652,705 claims only the use of nitrile electron donors reacted with $TiCl_4$ prior to treatment with organoaluminum compounds. These catalysts are used preferably in arene solution or slurry. U.S. Pat. Nos. 4,482, 639, 4,603,185, and 4,727,123 describe bimetallic complexes with monoanionic tridentate chelating ligands which are activated with aluminum alkyls for the polymerization of olefins, alkynes, and dienes. U.S. Pat. No. 5,021,595 describes catalysts based on soluble trivalent metal (especially vanadium) complexes of bidentate chelating ligands. These soluble complexes are prepared by reaction of the trivalent metal halide with compounds containing acidic hydrogen, and are activated for the polymerization of olefins with aluminum alkyls. U.S. Pat. No. 5,378,778 reports the reaction of titanium amides with organic oxygen-containing compounds having acidic hydrogens, followed by in-situ activation with aluminum alkyls to give highly active, unsupported olefin polymerization catalysts. U.S. Pat. No. 5,840,646 reports Ti, Zr, or Hf dialkyl complexes of chelating bis(alkoxide) ligands with a tethered Lewis base attached to the ligand backbone. These compounds may be used for the polymerization of olefins in the presence of an activator which generates a cationic complex, such as trityl tetrakis(pentafluorophenyl)borate or methyl alumoxane.

Aluminum alkyls are commonly used as activators or cocatalysts with Ziegler-Natta catalysts, and there are some examples of compounds of the form $AlR_{3-n}L_n$ (n=1 or 2), where each L is a monoanionic ligand. U.S. Pat. No. 3,489,736 illustrates the use of various aluminum nitrogen compounds, including carboxylic acid amides, as cocatalysts in conjunction with an aluminum halide as Lewis acid with Ziegler-Natta catalysts such as TiCl$_3$. U.S. Pat. No. 3,723,348 describes use of vanadium compounds with an activator which may be an aluminum alkoxide, amide, carboxylate, or acetylacetonate, among others. U.S. Pat. No. 3,786,032 utilizes the reaction product of an organoaluminum or organozinc with an oxime or hydroxyester as activators. U.S. Pat. No. 3,883,493 utilizes aluminum carbamates in conjunction with another organoaluminum compound as cocatalysts. Conjugated dienes may be polymerized using mixed titanium or vanadium halides, an aluminum trialkyl and a small amount of carbon disulfide, as reported in U.S. Pat. No. 3,948,869. U.S. Pat. No. 4,129,702 discloses use of aluminum or zinc salts of carboxylic acid amides as activators with Ziegler-Natta catalysts, optionally on a support, for the polymerization of vinyl or vinylidene halides, noting the improvement of aging the co-catalyst to eliminate isocyanate. U.S. Pat. No. 5,468,707 describes use of bidentate, dianionic Group 13 element compounds as co-catalysts. U.S. Pat. No. 5,728,641 also describes use of aluminum catecholate compounds as a components in a four-component catalyst system which includes organocyclic compounds with two or more conjugated double bonds.

Aluminum chelates have also been used as external donors. U.S. Pat. No. 3,313,791 discloses use of acetylacetonato aluminum alkoxides as external donors with a titanium trichloride and alkyl aluminum dihalide catalyst system. U.S. Pat. No. 3,919,180 discusses the use of external donors which may be bidentate in combination either with the titanium catalyst or the aluminum co-catalyst. U.S. Pat. No. 5,777,120 describes the use of cationic aluminum amidinate compounds as single site catalysts for the polymerization of olefins.

U.S. Pat. No. 3,534,006 describes a catalyst comprising Groups 4–6 metal compounds activated with bis(dialkylaluminoxy)alkane compounds. It further claims the use of additional external donors or promoters which include a wide variety of nitrogen-containing compounds. U.S. Pat. No. 4,195,069 describes the interaction of a TiCl$_4$ complex with a complexing agent with an organoaluminum complex with a complexing agent. This interaction results in reduction of TiCl$_4$ to a precipitate of TiCl$_3$.

SUMMARY OF THE INVENTION

A solid procatalyst prepared by reacting at least one transition metal compound of empirical formula MX$_4$, where M is titanium, hafnium, or zirconium and X is fluoride, chloride, bromide, or iodide, with at least one alkylating agent of the formula L$_x$ER$_n$Y$_m$H$_p$, where each L is independently a monoanionic, bidentate ligand bound to E by two atoms selected from the group consisting of oxygen, sulfur, selenium, tellurium, nitrogen, phosphorus, arsenic, antimony, and bismuth, or mixtures thereof, E is boron, aluminum, gallium, or indium, each R is independently a hydrocarbyl group, each Y is independently a monoanionic, monodentate ligand, 0<x≦2, n>0, m≧0, p≧0, and x+n+m+p=3, in at least one aprotic solvent to provide a soluble species which is subsequently contacted with a support. The resulting solid procatalyst, with a cocatalyst, provides a catalyst system suitable for the polymerization or interpolymerization of olefins.

DETAILED DESCRIPTION OF THE INVENTION

A solid procatalyst prepared by reacting at least one transition metal compound of empirical formula MX$_4$, where M is titanium, hafnium, or zirconium and X is fluoride, chloride, bromide, or iodide, with at least one alkylating agent of the formula L$_x$ER$_n$Y$_m$H$_p$, where each L is independently a monoanionic, bidentate ligand bound to E by two atoms selected from the group consisting of oxygen, sulfur, selenium, tellurium, nitrogen, phosphorus, arsenic, antimony, and bismuth, or mixtures thereof, E is boron, aluminum, gallium, or indium, each R is independently a hydrocarbyl group, each Y is independently a monoanionic, monodentate ligand, 0<x≦2, n>0, m≧0, p≧0, and x+n+m+p=3, in at least one aprotic solvent to provide a soluble species which is subsequently contacted with a support. Contacting the soluble species with the support includes depositing the soluble species on the support. Preferably, MX$_4$ is TiCl$_4$. The resulting solid procatalyst, with a cocatalyst, provides a catalyst system suitable for the polymerization or interpolymerization of olefins.

All mention herein to elements of Groups of the Periodic Table are made in reference to the Periodic Table of the Elements, as published in "Chemical and Engineering News", 63(5), 27, 1985. In this format, the Groups are numbered 1 to 18. The abbreviations Me (for methyl group), Et (for Ethyl group), TMA (for trimethylaluminum), and TEAL (for triethylaluminum) are used herein.

The present invention comprises a solid procatalyst prepared by reacting a transition metal compound of empirical formula MX$_4$ with an alkylating agent of the formula L$_x$ER$_n$Y$_m$H$_p$ in an aprotic solvent to provide a soluble species which is subsequently contacted with a support. In the event of any precipitation during the generation of the soluble component(s), the precipitate must be redissolved, filtered, or otherwise eliminated prior to contacting the soluble species with a support.

The molar ratio of the alkylating agent to the transition metal compound is preferably from about 0.1 to about 100. Preferably, the molar ratio of the alkylating agent to the transition metal compound is from about 0.25 to about 15. More preferably, the molar ratio of the alkylating agent to the transition metal compound is from about 1 to about 5.

The at least one transition metal compound used in the process of the present invention can be any compound of the empirical formula,

MX$_4$, or mixtures thereof, wherein M is selected from the group consisting of titanium, zirconium and hafnium and each X is independently selected from the group consisting of fluoride, chloride, bromide, and iodide.

Preferred for use herein as the transition metal compound are the titanium halides and mixed halides such as TiF$_4$, TiCl$_4$, TiBr$_4$, TiI$_4$, TiF$_n$Cl$_{4-n}$, TiF$_n$Br$_{4-n}$, TiF$_n$I$_{4-n}$, TiCl$_n$Br$_{4-n}$, TiCl$_n$I$_{4-n}$, TiBr$_n$I$_{4-n}$, where n is greater than zero, and the like, or mixtures thereof.

Most preferred for use herein as the at least one transition metal compound (MX$_4$) is TiCl$_4$.

The at least one alkylating agent used in the present invention can be any organometallic compound of the empirical formula, L$_x$ER$_n$Y$_m$H$_p$, or mixtures thereof, wherein, each L is independently a monoanionic, bidentate ligand bound to E by two atoms selected from the group consisting of oxygen, sulfur, selenium, tellurium, nitrogen, phosphorus, arsenic, antimony, and bismuth, or mixtures thereof;

E is selected from the group consisting of boron, aluminum, gallium, and indium;

each R is independently a hydrocarbyl group, each Y is independently a monoanionic, monodentate ligand, $0 < x \leq 2$, $n > 0$, $m \geq 0$, $p \geq 0$, and $x+n+m+p=3$.

The term "hydrocarbyl group", as used herein, denotes a monovalent, linear, branched, cyclic, or polycyclic group which contains carbon and hydrogen atoms. The hydrocarbyl group may optionally contain atoms in addition to carbon and hydrogen selected from Groups 13, 14, 15, 16, and 17 of the Periodic Table. Examples of monovalent hydrocarbyls include the following: $C_1$–$C_{30}$ alkyl; $C_1$–$C_{30}$ alkyl substituted with one or more groups selected from $C_1$–$C_{30}$ alkyl, $C_3$–$C_{15}$ cycloalkyl or aryl; $C_3$–$C_{15}$ cycloalkyl; $C_3$–$C_{15}$ cycloalkyl substituted with one or more groups selected from $C_1$–$C_{20}$ alkyl, $C_3$–$C_{15}$ cycloalkyl or aryl; $C_6$–$C_{15}$ aryl; and $C_6$–$C_{15}$ aryl substituted with one or more groups selected from $C_1$–$C_{30}$ alkyl, $C_3$–$C_{15}$ cycloalkyl or aryl; where aryl preferably denotes a substituted or unsubstituted phenyl, napthyl, or anthracenyl group.

The alkylating agent ($L_xER_nY_mH_p$), may be generated and/or introduced in any way to the aprotic solvent prior to contact with the alkylating agent, including dissolution of a pure species or by mixing, for example, a compound of empirical formula $ER_{n+1}Y_mH_p$ with the ligand (L), a complex of the ligand, or a salt of the ligand, in situ, followed by treatment with alkylating agent.

Examples of the monoanionic, bidentate ligand L bound to E are the conjugate bases of compounds containing acidic hydrogen and the conjugate bases of compounds containing an acidic carbon-hydrogen bond.

Examples of the monoanionic, bidentate ligand L bound to E useful herein which are the conjugate bases of compounds containing acidic hydrogen are carboxylic acids, carboxylic acid amides, carboxylic acid phosphides, thiocarboxylic acids, dithiocarboxylic acids, thiocarboxylic acid amides, thiocarboxylic acid phosphides, carbonic acid, carbamamic acids, ureas, thiocarbonic acid, thioureas, thiocarbamamic acids, dithiocarbamic acids, hydroxycarboxylic esters, hydroxycarboxylic acid amides, amino acid esters, hydroxythiocarboxylic esters, hydroxydithiocarboxylic esters, hydroxythiocarboxylic acid amides, hydroxycarboxylic thioesters, hydroxythiocarboxylic thioesters, hydroxydithiocarboxylic thioesters, mercaptocarboxylic esters, mercaptocarboxylic acid amides, mercaptothiocarboxylic esters, mercaptodithiocarboxylic esters, mercaptothiocarboxylic acid amides, mercaptocarboxylic thioesters, mercaptothiocarboxylic thioesters, mercaptodithiocarboxylic thioesters, hydroxyketones, hydroxyaldehydes, hydroxyimines, mercaptoketones, mercaptoaldehydes, mercaptoimines, hydroxythioketones, hydroxythioaldehydes, mercaptothioketones, mercaptothioaldehydes, 2-hydroxybenzaldehydes, 2mercaptobenzaldehydes, 2-aminobenzaldehydes, 2-hydroxybenzthioaldehydes, 2- hydroxybenzoate esters, 2-hydroxybenzamides, 2-hydroxybenzoate thioesters, 2hydroxythiobenzoate esters, 2-hydroxythiobenzamides, 2-hydroxybenzthioaldehydes, 2-mercaptobenzthioaldehydes, 2-aminobenzthioaldehydes, 2-hydroxyarylketones, 2-mercaptoarylketones, 2-aminoarylketones, 2-hydroxyarylimines, 2-mercaptoarylimines, 2-aminoarylimines, 2-hydroxyarylthioketones, 2-mercaptoarylthioketones, 2-aminoarylthioketones, benzoins, 2-pyrrolecarboxadehydes, 2-pyrrolethiocarboxadehydes, 2-pyrrolecarboxaldimines, hydrocarbyl 2-pyrrolyl ketones, hydrocarbyl 2-pyrrolyl imines, hydrocarbyl 2-pyrrolyl thioketones, 2-indolecarboxadehydes, 2indolethiocarboxadehydes, 2-indolecarboxaldimines, hydrocarbyl 2-indolyl ketones, hydrocarbyl 2-indolyl imines, hydrocarbyl 2-indolyl thioketones, hydroxyquinolines, tropolones, aminotropolones, aminotropone imines, and the like.

Examples of the monoanionic, bidentate ligand L bound to E useful herein which are the conjugate bases of compounds containing an acidic carbon-hydrogen bond are 1,3-diketones, betaketoacid esters, betaketoacid amides, 3-nitroketones, 3-nitroacid esters, 3-nitroacid amides, phthalate monoesters, di(2-furyl)alkanes, bis(5- (2,3-dihydrofuryl))alkanes, di(2-thiophenyl)alkanes, bis(5-(2,3-dihydrothiophenyl))alkanes, di(2-pyridyl)alkanes, malonate diesters, betaketoimines, 1,3-diimines, betaiminoacid esters, betaiminoacid amides, 3-nitroimines, alkylsulfinylacetate esters, alkylsulfonylacetate esters, bis(alkylsulfinyl)alkanes, bis(alkylsulfonyl)alkanes, and the like.

Preferred examples of the monoanionic, bidentate ligand L bound to E useful herein are the conjugate bases of 1,3-diketones such as acetylacetone, 3,5-heptanedione, 2,6-dimethyl-3,5-heptanedione, 5,7-undecanedione, benzoylacetone, dibenzoylmethane, 1,1,1-trifluoroacetylacetone, 1,1,1,5,5,5-hexafluoroacetylacetone, 2,2,6,6-tetramethyl-3,5-heptanedione, mono- and di-imine analogs of the above-listed 1,3-diketones, 2-hydroxybenzene carboxaldehydes, the imine analogs of the above-listed compounds, and the like.

Mixtures of monoanionic, bidentate ligands L bound to E may be used as the monoanionic, bidentate ligand L bound to E.

Examples of the monoanionic, monodentate ligand Y include the halides, —OR, —$OBR_2$, —OSR, —$ONR_2$, —$OPR_2$, —$NR_2$, —N(R)$BR_2$, —N(R)OR, —N(R)SR, —N(R)$NR_2$, —N(R)$PR_2$, —N($BR_2$)$_2$, —N=$CR_2$, —N=NR, —N=PR, —SR, —$SBR_2$, —SOR, —$SNR_2$, —$SPR_2$, —$PR_2$, and the like. Each R is independently a hydrocarbyl group, as defined above. Examples of halides are fluoride, chloride, bromide, and iodide.

Examples of alkoxides are methoxide, ethoxide, n-propoxide, i-propoxide, cyclopropyloxide, n-butoxide, i-butoxide, s-butoxide, t-butoxide, cyclobutyloxide, n-amyloxide, i-amyloxide, s-amyloxide, t-amyloxide, neopentoxide, cyclopentyloxide, n-hexoxide, cyclohexyloxide, heptoxide, octoxide, nonoxide, decoxide, undecoxide, dodecoxide, 2-ethyl hexoxide, phenoxide, 2,6-dimethylphenoxide, 2,6-di-i-propylphenoxide, 2,6-diphenylphenoxide, 2,6-dimesitylphenoxide, 2,4, 6trimethylphenoxide, 2,4,6-tri-i-propylphenoxide, 2,4,6-triphenylphenoxide, 2,4,6-trimesitylphenoxide, benzyloxide, menthoxide, and the like, halogenated alkoxides such as trifluoromethoxide, trifluoroethoxide, trifluoro-i-propoxide, hexafluoro-i-propoxide, heptafluoro-i-propoxide, trifluoro-t-butoxide, hexafluoro-t-butoxide, trifluoromethoxide, trichloroethoxide, trichloro-i-propoxide, and the like.

Examples of thiolates are methylthiolate, ethylthiolate, n-propylthiolate, i-propylthiolate, cyclopropylthiolate, n-butylthiolate, i-butylthiolate, s-butylthiolate, t-butylthiolate, cyclobutylthiolate, n-amylthiolate, i-amylthiolate, s-amylthiolate, t-amylthiolate, neopentylthiolate, cyclopentylthiolate, n-hexylthiolate, cyclohexylthiolate, phenylthiolate, 2,6-dimethylphenylthiolate, 2,6-di-i-propylphenylthiolate, 2,6-diphenylphenylthioate, 2,6-dimesitylphenylthiolate, 2,4,6-trimethylphenylthiolate, 2,4,6-tri-i-propylphenylthiolate, 2,4,6-triphenylphenylthiolate, 2,4,6-trimesitylphenylthiolate, benzylthiolate, heptylthiolate, octylthiolate, nonylthiolate, decylthiolate, undecylthiolate, dodecylthiolate, 2-ethyl hexylthiolate, menthylthiolate, and the like, halogenated alkylthiolates such as trifluoromethylthiolate, trifluoroethylthiolate, trifluoro-i-propylthiolate, hexafluoro-i-propylthiolate, heptafluoro-i-propylthiolate, trifluoro-t-butylthiolate, hexafluoro-t-butylthiolate, trifluoromethylthiolate, trichloroethylthiolate, trichloro-i-propylthiolate, and the like.

Examples of amides are dimethylamide, diethylamide, di-n-propylamide, di-i-propylamide, dicyclopropylamide, di-n-butylamide, di-i-butylamide, di-s-butylamide, di-t-butylamide, dicyclobutylamide, di-n-amylamide, di-i-amylamide, di-s-amylamide, di-t-amylamide, dicyclopentylamide, dineopentylamide, di-n-hexylamide, dicyclohexylamide, diheptylamide, dioctylamide, di-nonylamide, didecylamide, diundecylamide, didodecylamide, di-2-ethyl hexylamide, diphenylamide, bis-2,6-dimethylphenylamide, bis-2,6-di-i-propylphenylamide, bis-2,6-diphenylphenylamide, bis-2,6-dimesitylphenylamide, bis-2,4,6-trimethylphenylamide, bis-2,4,6-tri-i-propylphenylamide, bis-2,4,6-triphenylphenylamide, bis-2,4,6-trimesitylphenylamide, dibenzylamide, dihexylamide, dicyclohexylamide, dioctylamide, didecylamide, dioctadecylamide, diphenylamide, dibenzylamide, bis-2,6-dimethylphenylamide, 2,6-bis-i-propylphenylamide, bis-2,6-diphenylphenylamide, diallylamide, di-propenylamide, N-methylanilide; N-ethylanilide; N-propylanilide; N-i-propylanilide; N-butylanilide; N-i-butylanilide; N-amylanilide; N-i-amylanilide; N-octylanilide; N-cyclohexylanilide; and the like, silyl amides such as bis(trimethylsilyl)amide, bis(triethylsilyl)amide, bis(dimethylphenylsilyl)amide, bis(t-butyldimethylsilyl)amide, bis(t-butyldiphenylsilyl)amide, phenyl(trimethylsilyl)amide, phenyl(triethylsilyl)amide, phenyl(trimethylsilyl)amide, methyl(trimethylsilyl)amide, ethyl(trimethylsilyl)amide, n-propyl(trimethylsilyl)amide, i-propyl(trimethylsilyl)amide, cyclopropyl(trimethylsilyl)amide, n-butyl(trimethylsilyl)amide, i-butyl(trimethylsilyl)amide, s-butyl(trimethylsilyl)amide, t-butyl(trimethylsilyl)amide, cyclobutyl(trimethylsilyl)amide, n-amyl(trimethylsilyl)amide, i-amyl(trimethylsilyl)amide, s-amyl(trimethylsilyl)amide, t-amyl(trimethylsilyl)amide, neopentyl(trimethylsilyl)amide, cyclopentyl(trimethylsilyl)amide, n-hexyl(trimethylsilyl)amide, cyclohexyl(trimethylsilyl)amide, heptyl(trimethylsilyl)amide and triethylsilyl trimethylsilylamide, and the like, heterocyclic amides such as the conjugate bases of pyrrole, pyrrolidine, piperidine, piperazine, indole, imidazole, azole, thiazole, purine, phthalimide, azacycloheptane, azacyclooctane, azacyclononane, azacyclodecane, their substituted derivatives, and the like.

Examples of phosphides are dimethylphosphide, diethylphosphide, dipropylphosphide, dibutylphosphide, diamylphosphide, dihexylphosphide, dicyclohexylphosphide, diphenylphosphide, dibenzylphosphide, bis-2,6-dimethylphenylphosphide, 2,6-di-i-propylphenylphosphide, 2,6-diphenylphenylphosphide, and the like, the conjugate bases of cyclic phosphines such as phosphacyclopentane, phosphacyclohexane, phosphacycloheptane, phosphacyclooctane, phosphacyclononane, phosphacyclodecane, and the like.

Preferred for use herein as the monoanionic, monodentate ligand Y are fluoride, chloride, bromide, methoxide, ethoxide, n-propoxide, i-propoxide, butoxide, neopentoxide, benzyloxide, trifluoromethoxide, and trifluoroethoxide.

Mixtures of monoanionic, monodentate ligands Y may be used as the monoanionic, monodentate ligand Y.

Mixtures of the above alkylating agents can also be utilized herein as the alkylating agent.

The at least one aprotic solvent is a solvent which does not contain hydrogen atoms which may be removed by any of the species dissolved in said solvent(s), under the conditions used, in the form of a proton. Examples of such solvents include aliphatic, aromatic, and halogenated hydrocarbons, optionally containing other elements from Groups 13, 14, 15, or 16, inorganic solvents such as $CS_2$, $POCl_3$, $SO_2$ and the like. Preferably the solvent will be an aliphatic, aromatic, or halogenated hydrocarbon. More preferably the solvent will be an aliphatic, aromatic, or halogenated hydrocarbon containing from 4 to 40 carbon atoms, optionally containing up to 10 heteroatoms. Most preferably, the solvent is pentane, heptane, hexane, benzene, toluene, dichloromethane, or 1,2-dichloroethane.

Any inorganic or organic support(s) may be used in the present invention. Examples of suitable inorganic supports are clays, metal oxides, metal hydroxides, metal halogenides or other metal salts, such as sulphates, carbonates, phosphates, nitrates and silicates. Further examples of inorganic supports suitable for use herein are compounds of metals from Groups 1 and 2 of the of the Periodic Table of the Elements, such as salts of sodium or potassium and oxides or salts of magnesium or calcium, for instance the chlorides, sulphates, carbonates, phosphates or silicates of sodium, potassium, magnesium or calcium and the oxides or hydroxides of, for instance, magnesium or calcium. Also suitable for use are inorganic oxides such as silica, titania, alumina, zirconia, chromia, boron oxide, silanized silica, silica hydrogels, silica xerogels, silica aerogels, and mixed oxides such as talcs, silica/chromia, silica/chromia/titania, silica/alumina, silica/titania, silica/magnesia, silica/magnesia/titania, aluminum phosphate gels, silica co-gels and the like. The inorganic oxides may contain carbonates, nitrates, sulfates and oxides such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$. Supports containing at least one component selected from the group consisting of $MgCl_2$, $SiO_2$, $Al_2O_3$ or mixtures thereof as a main component are preferred.

Examples of suitable organic supports include polymers such as, for example, functionalized polyethylene, functionalized polypropylene, functionalized interpolymers of ethylene and alpha-olefins, polystyrene, functionalized polystyrene, polyamides and polyesters.

Examples of suitable polymeric inorganic supports include carbosiloxanes, phosphazines, siloxanes, and hybrid materials such as polymer/silica hybrids.

Preferred for use herein are inorganic oxides such as silica, titania, alumina, and mixed oxides such as talcs, silica/chromia, silica/chromia/titania, silica/alumina, silica/titania, and Group 2 halogenides such as magnesium chloride, magnesium bromide, calcium chloride, and calcium bromide, and inorganic oxide supports containing magnesium chloride deposited or precipitated on the surface of the above-mentioned oxide.

Most preferred for use herein are inorganic oxide supports containing magnesium chloride deposited or precipitated on the surface of the above-mentioned oxides such as magnesium chloride on silica.

In a further embodiment of the present invention it has been found that solid procatalysts as described above can be produced comprising at least one internal electron donor. A solid procatalyst is prepared by reacting at least one transition metal compound of empirical formula $MX_4$, where M is titanium, zirconium, or hafnium and X is fluoride, chloride, bromide, or iodide, with at least one alkylating agent of the formula $L_xER_nY_mH_p$, where each L is independently a monoanionic, bidentate ligand bound to E by two atoms selected from the group consisting of oxygen, sulfur, selenium, tellurium, nitrogen, phosphorus, arsenic, antimony, and bismuth, or mixtures thereof, E is boron, aluminum, gallium, or indium, each R is independently a hydrocarbyl group, each Y is independently a monoanionic, monodentate ligand, $0<x\leq2$, $n>0$, $m\geq0$, $p\geq0$ and $x+n+m+p=3$, and at least one internal electron donor in at least one aprotic solvent to provide a soluble species which is subsequently contacted with a support. Contacting the soluble species with the support includes depositing the soluble species on the support. The resulting solid procatalyst, with a cocatalyst, provides a catalyst system suitable for the polymerization or interpolymerization of olefins.

The molar ratio of the internal electron donor to the transition metal compound is preferably from about 0.1 to about 100. Preferably, the molar ratio of the internal electron donor to the transition metal compound is from about 0.25 to about 15. More preferably, the molar ratio of the internal electron donor to the transition metal compound is from about 1 to about 5.

Examples of the internal electron donor are carboxylic acid esters, anhydrides, acid halides, ethers, thioethers, aldehydes, ketones, imines, amines, amides, nitriles, isonitriles, cyanates, isocyanates, thiocyanates, isothiocyanates, thioesters, dithioesters, carbonic esters, hydrocarbyl carbamates, hydrocarbyl thiocarbamates, hydrocarbyl dithiocarbamates, urethanes, phosphines, sulfides, phosphine oxides, phosphamides, sulfoxides, sulfones, sulfonamides, organosilicon compounds containing at least one oxygen atom, and nitrogen, phosphorus, arsenic or antimony compounds connected to an organic group through a carbon or oxygen atom.

Examples of ethers useful herein as the internal electron donor are any compounds containing at least one C—O—C ether linkage. Included within the ether compounds are compounds containing heteroatoms, which are atoms other than carbon, selected from Groups 13, 14, 15, 16 and 17 of the Periodic Table of Elements. Examples ethers are dialkyl ethers, diaryl ethers, dialkaryl ethers, diaralkyl ethers, alkyl aryl ethers, alkyl alkaryl ethers, alkyl aralkyl ethers, aryl alkaryl ethers, aryl aralkyl ethers and alkaryl aralkyl ethers. Included within the ethers are compounds such as dimethyl ether; diethyl ether; dipropyl ether; diisopropyl ether; dibutyl ether; diisoamyl ether; di-tert-butyl ether; diphenyl ether; dibenzyl ether; divinyl ether; butyl methyl ether; butyl ethyl ether; sec-butyl methyl ether; tert-butyl methyl ether; cyclopentyl methyl ether; cyclohexyl ethyl ether; tert-amyl methyl ether; sec-butyl ethyl ether; chloromethyl methyl ether; trimethylsilylmethyl methyl ether; bis(trimethylsilylmethyl) ether; bis(2,2,2-trifluoroethyl) ether; methyl phenyl ether; ethylene oxide; propylene oxide; 1,2-epoxybutane; cyclopentene oxide; epichlorohydrin; furan; 2,3-dihydrofuran; 2,5-dihydrofuran; tetrahydrofuran; 2-methyltetrahydrofuran; 2, 5-dimethyltetrahydrofuran; 2-methylfuran; 2,5-dimethylfuran; tetrahydropyran; 1,2-epoxybut-3-ene; styrene oxide; 2-ethylfuran; oxazole; 1,3,4-oxadiazole; 3,4-dichloro-1,2-epoxybutane; 3,4-dibromo-1,2-epoxybutane; dimethoxymethane; 1,1-dimethoxyethane; 1,1,1-trimethoxymethane; 1,1,1-trimethoxyethane; 1,1,2-trimethoxyethane; 1,1-dimethoxypropane; 1,2-dimethoxypropane; 2,2-dimethoxypropane; 1,3-dimethoxypropane; 1,1,3-trimethoxypropane; 1,4-dimethoxybutane; 1,2-dimethoxybenzene; 1,3-dimethoxybenzene; 1,4-dimethoxybenzene; ethylene glycol dimethyl ether; di(ethylene glycol) dimethyl ether; di(ethylene glycol) diethyl ether; di(ethylene glycol) dibutyl ether; di(ethylene glycol) tert-butyl methyl ether; tri(ethylene glycol) dimethyl ether; tri(ethylene glycol) diethyl ether; tetra(ethylene glycol) dimethyl ether; 2,2-diethyl-1,3-dimethoxypropane; 2-methyl-2-ethyl-1,3-dimethoxypropane; 2-methoxyfuran; 3-methoxyfuran; 1,3-dioxolane; 2-methyl-1,3-dioxolane; 2,2-dimethyl-1,3-dioxolane; 2-ethyl-2-methyl-1,3-dioxolane; 2,2-tetramethylene-1,3-dioxolane; 2,2-pentamethylene-1,3-dioxolane; 1,3-dioxane; 1,4-dioxane; 4-methyl-1,3-dioxane; 1,3,5-trioxane and 3,4-epoxytetrahydrofuran and the like.

Preferred ether compounds for use herein as the internal electron donor are tetrahydrofuran, diethyl ether, dipropyl ether, diisopropyl ether, dibutyl ether, dioctyl ether, tert-butyl methyl ether, trimethylene oxide, 1,2-dimethoxyethane, 1,2-dimethoxypropane, 1,3-dimethoxypropane, 1,2-dimethoxybutane, 1,3-dimethoxybutane, 1,4-dimethoxybutane, and tetrahydropyran.

Examples of thioethers useful herein as the internal electron donor are any compounds containing at least one C—S—C thioether linkage. Included within the thioether compounds are compounds containing heteroatoms, which are atoms other than carbon, selected from Groups 13, 14, 15, 16 and 17 of the Periodic Table of Elements. Examples of thioethers are dialkyl thioethers, diaryl thioethers, dialkaryl thioethers, diaralkyl thioethers, alkyl aryl thioethers, alkyl alkaryl thioethers, alkyl aralkyl thioethers, aryl alkaryl thioethers, aryl aralkyl thioethers and alkaryl aralkyl thioethers. Included are compounds such as dimethyl sulfide; diethyl sulfide; dipropyl sulfide; diisopropyl sulfide; dibutyl sulfide; dipentyl sulfide; dihexyl sulfide; dioctyl sulfide; diisoamyl sulfide; di-tert-butyl sulfide; diphenyl sulfide; dibenzyl sulfide; divinyl sulfide; diallyl sulfide; dipropargyl sulfide; dicyclopropyl sulfide; dicyclopentyl sulfide; dicyclohexyl sulfide; allyl methyl sulfide; allyl ethyl sulfide; allyl cyclohexyl sulfide; allyl phenyl sulfide; allyl benzyl sulfide; allyl 2-tolyl sulfide; allyl 3-tolyl sulfide; benzyl methyl sulfide; benzyl ethyl sulfide; benzyl isoamyl sulfide; benzyl chloromethyl sulfide; benzyl cyclohexyl sulfide; benzyl phenyl sulfide; benzyl 1-naphthyl sulfide; benzyl 2-naphthyl sulfide; butyl methyl sulfide; butyl ethyl sulfide; sec-butyl methyl sulfide; tert-butyl methyl sulfide; butyl cyclopentyl sulfide; butyl 2-chloroethyl sulfide; cyclopentyl methyl sulfide; cyclohexyl ethyl sulfide; cyclohexyl vinyl sulfide; tert-amyl methyl sulfide; sec-butyl ethyl sulfide; tert-butyl ethyl sulfide; tert-amyl ethyl sulfide; cyclododecyl methyl sulfide; bis(2-cyclopenten-1-yl) sulfide; 1-methylthio-1,3-cyclohexadiene; 1-methylthio-1,4-cyclohexadiene; chloromethyl methyl sulfide; chloromethyl ethyl sulfide; bis(2-tolyl) sulfide; trimethylsilylmethyl methyl sulfide; trimethylene sulfide; thiophene; 2,3-dihydrothiophene; 2,5-dihydrothiophene; tetrahydrothiophene; 2-methyltetrahydrothiophene; 2,5-dimethyltetrahydrothiophene; 4,5-dihydro-2-methylthiophene; 2-methylthiophene; 2,5-dimethylthiophene; 3-bromothiophene; 2,3- benzothiophene; 2-methylbenzothiophene; dibenzothiophene; isobenzothiophene; 1,1-bis(methylthio) ethane; 1,1,1-tris(methylthio)ethane; 1,1,2-tris(methylthio) ethane; 1,1-bis(methylthio)propane; 1,2-bis(methylthio) propane; 2,2-bis(methylthio)propane; 1,3-bis(methylthio) propane; 1,1,3-tris(methylthio)propane; 1,4-bis(methylthio) butane; 1,2-bis(methylthio)benzene; 1,3-bis(methylthio) benzene; 1,4-bis(methylthio)benzene; ethylene glycol dimethyl sulfide; ethylene glycol diethyl sulfide; ethylene glycol divinyl sulfide; ethylene glycol diphenyl sulfide; ethylene glycol tert-butyl methyl sulfide; ethylene glycol tert-butyl ethyl sulfide; 2,5-bis(methylthio)thiophene; 2-methylthiothiophene; 3-methylthiothiophene; 2-methylthiotetrahydropyran; 3-methylthiotetrahydropyran; 1,3-dithiolane; 2-methyl-1,3-dithiolane; 2,2-dimethyl-1,3-dithiolane; 2-ethyl-2-methyl-1,3-dithiolane; 2,2-tetramethylene-1,3-dithiolane; 2,2-pentamethylene-1,3-dithiolane; 2-vinyl-1,3-dithiolane; 2-chloromethyl-1,3-dithiolane; 2-methylthio-1,3-dithiolane; 1,3-dithiane; 1,3-dithiane; 4-methyl-1,3-dithiane; 1,3,5-trithiane; 2-(2-ethylhexyl)-1,3-bis(methylthio)propane; 2-isopropyl- 1,3-bis(methylthio)propane; 2-butyl-1,3-bis(methylthio) propane; 2-sec-butyl-1,3-bis(methylthio)propane; 2-tert-butyl-1,3-bis(methylthio)propane; 2-cyclohexyl-1,3-bis (methylthio)propane; 2-phenyl-1,3-bis(methylthio)propane; 2-cumyl-1,3-bis(methylthio)propane; 2-(2-phenylethyl)-1, 3-bis(methylthio)propane; 2-(2-cyclohexylethyl)-1,3-bis (methylthio)propane; 2-(p-chlorophenyl)-1,3-bis (methylthio)propane; 2-(p-fluorophenyl)-1,3-bis (methylthio)propane; 2-(diphenylmethyl)-1,3-bis (methylthio)propane; 2,2-dicyclohexyl-1,3-bis(methylthio) propane; 2,2-diethyl-1,3-bis(methylthio)propane; 2,2-dipropyl-1,3-bis(methylthio)propane; 2,2-diisopropyl-1,3-bis(methylthio)propane; 2,2-dibutyl-1,3-bis(methylthio) propane; 2,2-diisobutyl-1,3-bis(methylthio)propane; 2-methyl-2-ethyl-1,3-bis(methylthio)propane; 2-methyl-2-propyl-1,3-bis(methylthio)propane; 2-methyl-2-butyl-1,3-bis(methylthio)propane; 2-methyl-2-benzyl-1,3-bis (methylthio)propane; 2-methyl-2-methylcyclohexyl-1,3-bis (methylthio)propane; 2-isopropyl-2-isopentyl-1,3-bis (methylthio)propane; 2,2-bis(2-cyclohexylmethyl)-1,3-bis (methylthio)propane and the like.

Any amine may be used herein as the internal electron donor. Included are amine compounds containing heteroatoms, which are atoms other than carbon, selected from Groups 13, 14, 15, 16 and 17 of the Periodic Table of Elements. Examples of amines are primary, secondary and tertiary alkyl, aryl, alkaryl and aralkyl substituted amines. Examples of amines are ammonia; methylamine; ethylamine; propylamine; isopropylamine; butylamine; isobutylamine; amylamine; isoamylamine; octylamine; cyclohexylamine; aniline; dimethylamine; diethylamine; dipropylamine; diisopropylamine; dibutylamine; diisobutylamine; diamylamine; diisoamylamine; dioctylamine; dicyclohexylamine; trimethylamine; triethylamine; tripropylamine; triisopropylamine; tributylamine; triisobutylamine; triamylamine; triisoamylamine; trioctylamine; tricyclohexylamine; N-methylaniline; N-ethylaniline; N-propylaniline; N-isopropylaniline; N-butylaniline; N-isobutylaniline; N-amylaniline; N-isoamylaniline; N-octylaniline; N-cyclohexylaniline; N,N-dimethylaniline; N,N-diethylaniline; N,N-dipropylaniline; N,N-diisopropylaniline; N,N-dibutylaniline; N,N-diisobutylaniline; N,N-diamylaniline; N,N-diisoamylaniline; N,N-dioctylaniline; N,N-dicyclohexylaniline; azetidine; 1-methylazetidine; 1-ethylazetidine; 1-propylazetidine; 1-isopropylazetidine; 1-butylazetidine; 1-isobutylazetidine; 1-amylazetidine; 1isoamylazetidine; pyrrolidine; N-methylimidazole; 1-methylpyrrolidine; 1ethylpyrrolidine; 1-propylpyrrolidine; 1-isopropylpyrrolidine; 1-butylpyrrolidine; 1isobutylpyrrolidine; 1-amylpyrrolidine; 1-isoamylpyrrolidine; 1-octylpyrrolidine; 1cyclohexylpyrrolidine; 1-phenylpyrrolidine; piperidine; 1-methylpiperidine; 1ethylpiperidine; 1-propylpiperidine; 1-isopropylpiperidine; 1-butylpiperidine; 1-isobutylpiperidine; 1-amylpiperidine; 1-isoamylpiperidine; 1-octylpiperidine; 1-cyclohexylpiperidine; 1-phenylpiperidine; piperazine; 1-methylpiperazine; 1ethylpiperazine; 1-propylpiperazine; 1-isopropylpiperazine; 1-butylpiperazine; 1-isobutylpiperazine; 1-amylpiperazine; 1-isoamylpiperazine; 1-octylpiperazine; 1-cyclohexylpiperazine; 1-phenylpiperazine; 1,4-dimethylpiperazine; 1,4-diethylpiperazine; 1,4-dipropylpiperazine; 1,4-diisopropylpiperazine; 1,4-dibutylpiperazine; 1,4-diisobutylpiperazine; 1,4-diamylpiperazine; 1,4-diisoamylpiperazine; 1,4-dioctylpiperazine; 1,4-dicyclohexylpiperazine; 1,4-diphenylpiperazine; pyridine; 2-methyl pyridine; 4-methyl pyridine; hexamethyidisilazane; morpholine; N-methylmorpholine and the like.

Examples of carboxylic acid esters useful herein as the internal electron donor are any carboxylic acid ester compounds containing at least one C(=O)—O—C ester linkage. Examples of carboxylic acid esters are saturated or unsaturated aliphatic, alicyclic, or aromatic compounds containing an ester linkage. Included within the carboxylic acid esters are compounds containing heteroatoms, which are atoms other than carbon, selected from Groups 13, 14, 15, 16 and 17 of the Periodic Table of Elements. Further examples are carboxylic acid esters such as methyl formate; methyl acetate; ethyl acetate; vinyl acetate; propyl acetate; butyl acetate; isopropyl acetate; isobutyl acetate; octyl acetate; cyclohexyl acetate; ethyl propionate; ethyl valerate; methyl chloroacetate; ethyl dichloroacetate, methyl methacrylate; ethyl crotonate; ethyl pivalate; methyl benzoate; ethyl benzoate; propyl benzoate; butyl benzoate; isobutyl benzoate; isopropyl benzoate; octyl benzoate; cyclohexyl benzoate; phenyl benzoate; benzyl benzoate; methyl 2-methylbenzoate; ethyl 2-methylbenzoate; propyl 2-methylbenzoate; isopropyl 2-methylbenzoate; butyl 2-methylbenzoate; isobutyl 2-methylbenzoate; octyl 2-methylbenzoate; cyclohexyl 2-methylbenzoate; phenyl 2-methylbenzoate; benzyl 2-methylbenzoate; methyl 3-methylbenzoate; ethyl 3-methylbenzoate; propyl 3-methylbenzoate; isopropyl 3-methylbenzoate; butyl 3-methylbenzoate; isobutyl 3-methylbenzoate; octyl 3-methylbenzoate; cyclohexyl 3-methylbenzoate; phenyl 3-methylbenzoate; benzyl 3-methylbenzoate; methyl 4-methylbenzoate; ethyl 4-methylbenzoate; propyl 4-methylbenzoate; isopropyl 4-methylbenzoate; butyl 4-methylbenzoate; isobutyl 4-methylbenzoate; octyl 4-methylbenzoate; cyclohexyl 4-methylbenzoate; phenyl 4-methylbenzoate; benzyl 4-methylbenzoate; methyl o-chlorobenzoate; ethyl o-chlorobenzoate; propyl o-chlorobenzoate; isopropyl o-chlorobenzoate; butyl o-chlorobenzoate; isobutyl o-chlorobenzoate; amyl o-chlorobenzoate; isoamyl o-chlorobenzoate; octyl o-chlorobenzoate; cyclohexyl o-chlorobenzoate; phenyl o-chlorobenzoate; benzyl o-chlorobenzoate; methyl m-chlorobenzoate; ethyl m-chlorobenzoate; propyl m-chlorobenzoate; isopropyl m-chlorobenzoate; butyl m-chlorobenzoate; isobutyl m-chlorobenzoate; amyl m-chlorobenzoate; isoamyl m-chlorobenzoate; octyl m-chlorobenzoate; cyclohexyl m-chlorobenzoate; phenyl m-chlorobenzoate; benzyl m-chlorobenzoate; methyl p-chlorobenzoate; ethyl p-chlorobenzoate; propyl p-chlorobenzoate; isopropyl p-chlorobenzoate; butyl p-chlorobenzoate; isobutyl p-chlorobenzoate; amyl p-chlorobenzoate; isoamyl p-chlorobenzoate; octyl p-chlorobenzoate; cyclohexyl p-chlorobenzoate; phenyl p-chlorobenzoate; benzyl p-chlorobenzoate; dimethyl maleate; dimethyl phthalate; diethyl phthalate; dipropyl phthalate; dibutyl phthalate; diisobutyl phthalate; methyl ethyl phthalate; methyl propyl phthalate; methyl butyl phthalate; methyl isobutyl phthalate; ethyl propyl phthalate; ethyl butyl phthalate; ethyl isobutyl phthalate; propyl butyl phthalate; propyl isobutyl phthalate; dimethyl terephthalate; diethyl terephthalate; dipropyl terephthalate; dibutyl terephthalate; diisobutyl terephthalate; methyl ethyl terephthalate; methyl propyl terephthalate; methyl butyl terephthalate; methyl isobutyl terephthalate; ethyl propyl terephthalate; ethyl butyl terephthalate; ethyl isobutyl terephthalate; propyl butyl terephthalate; propyl isobutyl terephthalate; dimethyl isophthalate; diethyl isophthalate; dipropyl isophthalate; dibutyl isophthalate; diisobutyl isophthalate; methyl ethyl isophthalate; methyl propyl isophthalate; methyl butyl isophthalate; methyl isobutyl isophthalate; ethyl propyl isophthalate; ethyl butyl isophthalate; ethyl isobutyl isophthalate; propyl butyl isophthalate; propyl isobutyl isophthalate, cellulose acetate, cellulose butyrate, mixed esters of cellulose and the like.

Examples of thioesters useful herein as the internal electron donor are compounds containing at least one C(=O)—S—C thioester linkage. Examples are saturated or unsaturated aliphatic, alicyclic, or aromatic compounds containing a thioester linkage. Included within the thioesters are compounds containing heteroatoms, which are atoms other than carbon, selected from Groups 13, 14, 15, 16 and 17 of the Periodic Table of Elements. Examples of thioesters are methyl thiolacetate; ethyl thiolacetate; propyl thiolacetate; isopropyl thiolacetate; butyl thiolacetate; isobutyl thiolacetate; amyl thiolacetate; isoamyl thiolacetate; octyl thiolacetate; cyclohexyl thiolacetate; phenyl thiolacetate; 2-chloroethyl thiolacetate; 3-chloropropyl thiolacetate; methyl thiobenzoate; ethyl thiobenzoate; propyl thiobenzoate; isopropyl thiobenzoate; butyl thiobenzoate; isobutyl thiobenzoate; amyl thiobenzoate; isoamyl thiobenzoate; octyl thiobenzoate; cyclohexyl thiobenzoate; phenyl thiobenzoate; 2-chloroethyl thiobenzoate; 3-chloropropyl thiobenzoate and the like.

Examples of amides useful herein as the internal electron donor are compounds containing at least one C(=O)—N amide linkage. Examples are saturated or unsaturated aliphatic, alicyclic, or aromatic compounds containing an amide linkage. Included within the amides are compounds containing heteroatoms, which are atoms other than carbon, selected from Groups 13, 14, 15, 16 and 17 of the Periodic Table of Elements. Examples amides are formamide; acetamide; propionamide; isobutyramide; trimethylacetamide; hexanoamide; octadecanamide; cyclohexanecarboxamide; 1-adamantanecarboxamide; acrylamide; methacrylamide; 2-fluoroacetamide; 2-chloroacetamide; 2-bromoacetamide; 2,2-dichloroacetamide; 2,2,2-trifluoroacetamide; 2,2,2-trichloroacetamide; 2-chloropropionamide; benzamide; N-methylformamide; N-ethylformamide; N-propylformamide; N-butylformamide; N-isobutylformamide; N-amylformamide; N-cyclohexylformamide; formanilide; N-methylacetamide; N-ethylacetamide; N-propylacetamide; N-butylacetamide; N-isobutylacetamide; N-amylacetamide; N-cyclohexylacetamide; acetanilide; N-methylpropionamide; N-ethylpropionamide; N-propylpropionamide; N-butylpropionamide; N-isobutylpropionamide; N-amylpropionamide; N-cyclohexylpropionamide; N-phenylpropionamide; N-methylisobutyramide; N-methyltrimethylacetamide; N-methylhexanoamide; N-methyloctadecanamide; N-methylacrylamide; N-methylmethacrylamide; N-methyl-2-fluoroacetamide; N-methyl-2-chloroacetamide; N-methyl-2-bromoacetamide; N-methyl-2,2-dichloroacetamide; N-methyl-2,2,2-trifluoroacetamide; N-methyl-2,2,2-trichloroacetamide; N-methyl-2-chloropropionamide; N,N-dimethylformamide; N,N-diethylformamide; N,N-diisopropylformamide; N,N-dibutylformamide; N-methylformanilide; N,N-dimethylacetamide; N,N-diethylacetamide; N,N-diisopropylacetamide; N,N-dibutylacetamide; N-methylacetanilide; N,N-dimethylpropionamide; N,N-diethylpropionamide; N,N-diisopropylpropionamide; N,N-dibutylpropionamide; N,N-dimethylisobutyramide; N,N-dimethyltrimethylacetamide; N,N-dimethylhexanoamide; N,N-dimethyloctadecanamide; N,N-dimethylacrylamide; N,N-dimethylmethacrylamide; N,N-dimethyl-2-fluoroacetamide; N,N-dimethyl-2-chloroacetamide; N,N-dimethyl-2-bromoacetamide; N,N-dimethyl-2,2-dichloroacetamide; N,N-dimethyl-2,2,2-trifluoroacetamide; N,N-diethyl-2,2,2-trifluoroacetamide; N,N-diisopropyl-2,2,2-trifluoroacetamide; N,N-dibutyl-2,2,2-trifluoroacetamide; N,N-dimethyl-2,2,2-trichloroacetamide; N,N-diethyl-2,2,2-trichloroacetamide; N,N-diisopropyl-2,2,2-trichloroacetamide; N,N-dibutyl-2,2,2-trichloroacetamide; N,N-dimethyl-2-chloropropionamide; 1-acetylazetidine; 1-acetylpyrrolidine; 1-acetylpiperidine; 1-acetylpiperazine; 1-acetylpiperazine; 1,4-diacetylpiperazine and the like.

Examples of anhydrides useful herein as the internal electron donor are compounds containing at least one C(=O)—O—C(=O) anhydride linkage. Examples are saturated or unsaturated aliphatic, alicyclic, or aromatic compounds containing an anhydride linkage. Included within the anhydrides are compounds containing heteroatoms, which are atoms other than carbon, selected from Groups 13, 14, 15, 16 and 17 of the Periodic Table of Elements. Examples of anhydrides are acetic anhydride; propionic anhydride; butyric anhydride; isobutyric anhydride; valeric anhydride; trimethylacetic anhydride; hexanoic anhydride; heptanoic anhydride; decanoic anhydride; lauric anhydride; myristic anhydride; palmitic anhydride; stearic anhydride; docosanoic anhydride; crotonic anhydride; methacrylic anhydride; oleic anhydride; linoleic anhydride; chloroacetic anhydride; iodoacetic anhydride; dichloroacetic anhydride; trifluoroacetic anhydride; chlorodifluoroacetic anhydride; trichloroacetic anhydride; pentafluoropropionic anhydride; heptafluorobutyric anhydride; succinic anhydride; methylsuccinic anhydride; 2,2-dimethylsuccinic anhydride; itaconic anhydride; maleic anhydride; glutaric anhydride; diglycolic anhydride; benzoic anhydride; phenylsuccinic anhydride; phenylmaleic anhydride; homophthalic anhydride; isatoic anhydride; phthalic anhydride; tetrafluorophthalic anhydride; tetrabromophthalic anhydride, mixed anhydrides and the like.

Examples of acid halides useful herein as the internal electron donor are compounds containing at least one —C(=O)—X acid halide group where X is a halogen. Examples are saturated or unsaturated aliphatic, alicyclic, or aromatic compounds containing an acid halide group. Included within the acid halides are compounds containing heteroatoms, which are atoms other than carbon, selected from Groups 13, 14, 15, 16 and 17 of the Periodic Table of Elements. Examples of acid halides are acetyl chloride; acetyl bromide; chloroacetyl chloride; dichloroacetyl chloride; trichloroacetyl chloride; trifluoroacetyl chloride; tribromoacetyl chloride; propionyl chloride; propionyl bromide; butyryl chloride; isobutyryl chloride; trimethylacetyl chloride; 3-cyclopentylpropionyl chloride; 2-chloropropionyl chloride; 3chloropropionyl chloride; tert-butylacetyl chloride; isovaleryl chloride; hexanoyl chloride; heptanoyl chloride; decanoyl chloride; lauroyl chloride; myristoyl chloride; palmitoyl chloride; stearoyl chloride; oleoyl chloride; cyclopentanecarbonyl chloride; oxalyl chloride; malonyl dichloride; succinyl chloride glutaryl dichloride; adipoyl chloride; pimeloyl chloride; suberoyl chloride; azelaoyl chloride; sebacoyl chloride; dodecanedioyl dichloride; methoxyacetyl chloride; acetoxyacetyl chloride and the like.

Examples of aldehydes useful herein as the internal electron donor are compounds containing at least one C—C (═O)—H aldehyde group. Examples are saturated or unsaturated aliphatic, alicyclic, or aromatic compounds containing an aldehyde group. Included within the aldehydes are compounds containing heteroatoms, which are atoms other than carbon, selected from Groups 13, 14, 15, 16 and 17 of the Periodic Table of Elements. Examples of aldehydes are formaldehyde; acetaldehyde; propionaldehyde; isobutyraldehyde; trimethylacetaldehyde; butyraldehyde; 2-methylbutyraldehyde; valeraldehyde; isovaleraldehyde; hexanal; 2-ethylhexanal; heptaldehyde; decyl aldehyde; crotonaldehyde; acrolein; methacrolein; 2-ethylacrolein; chloroacetaldehyde; iodoacetaldehyde; dichloroacetaldehyde; trifluoroacetaldehyde; chlorodifluoroacetaldehyde; trichloroacetaldehyde; pentafluoropropionaldehyde; heptafluorobutyraldehyde; phenylacetaldehyde; benzaldehyde; o-tolualdehyde; m-tolualdehyde; p-tolualdehyde; trans-cinnamaldehyde; trans-2-nitrocinnamaldehyde; 2-bromobenzaldehyde; 2-chlorobenzaldehyde; 3-chlorobenzaldehyde; 4-chlorobenzaldehyde and the like.

Examples of ketones useful herein as the internal electron donor are compounds containing at least one C—C (═O)—C ketone linkage. Examples are saturated or unsaturated aliphatic, alicyclic, or aromatic compounds containing a ketone linkage. Included within the ketones are compounds containing heteroatoms, which are atoms other than carbon, selected from Groups 13, 14, 15, 16 and 17 of the Periodic Table of Elements. Examples of ketones are acetone; 2-butanone; 3-methyl-2-butanone; pinacolone; 2-pentanone; 3-pentanone; 3-methyl-2-pentanone; 4-methyl-2-pentanone; 2-methyl-3-pentanone; 4,4-dimethyl-2-pentanone; 2,4dimethyl-3-pentanone; 2,2,4,4-tetramethyl-3-pentanone; 2-hexanone; 3-hexanone; 5methyl-2-hexanone; 2-methyl-3-hexanone; 2-heptanone; 3-heptanone; 4-heptanone; 2-methyl-3-heptanone; 5-methyl-3-heptanone; 2,6-dimethyl-4-heptanone; 2octanone; 3-octanone; 4-octanone; acetophenone; benzophenone; mesityl oxide; hexafluoroacetone; perfluoro-2-butanone; 1,1,1-trichloroacetone and the like.

Examples of nitriles useful herein as the internal electron donor are compounds containing at least one C—C—N nitrile group. Examples are saturated or unsaturated aliphatic, alicyclic, or aromatic compounds containing a nitrile group. Included within the nitriles are compounds containing heteroatoms, which are atoms other than carbon, selected from Groups 13, 14, 15, 16 and 17 of the Periodic Table of Elements. Examples of nitriles are acetonitrile; propionitrile; isopropionitrile; butyronitrile; isobutyronitrile; valeronitrile; isovaleronitrile; trimethylacetonitrile; hexanenitrile; heptanenitrile; heptyl cyanide; octyl cyanide; undecanenitrile; malononitrile; succinonitrile; glutaronitrile; adiponitrile; sebaconitrile; allyl cyanide; acrylonitrile; crotononitrile; methacrylonitrile; fumaronitrile; tetracyanoethylene; cyclopentanecarbonitrile; cyclohexanecarbonitrile; dichloroacetonitrile; fluoroacetonitrile; trichloroacetonitrile; benzonitrile; benzyl cyanide; 2-methylbenzyl cyanide; 2-chlorobenzonitrile; 3-chlorobenzonitrile; 4-chlorobenzonitrile; o-tolunitrile; m-tolunitrile; p-tolunitrile and the like.

Examples of isonitriles or isocyanides useful herein as the internal electron donor are compounds containing at least one C—N≡C isocyanide group. Examples are saturated or unsaturated aliphatic, alicyclic, or aromatic compounds containing a isocyanide group. Included within the isocyanides are compounds containing heteroatoms, which are atoms other than carbon, selected from Groups 13, 14, 15, 16 and 17 of the Periodic Table of Elements. Examples of isocyanides are methyl isocyanide; ethyl isocyanide; propyl isocyanide; isopropyl isocyanide; n-butyl isocyanide; t-butyl isocyanide; s-butyl isocyanide; pentyl cyanide; hexyl isocyanide; heptyl isocyanide; octyl isocyanide; nonyl isocyanide; decyl isocyanide; undecane isocyanide; benzyl isocyanide; 2-methylbenzyl isocyanide; 2-chlorobenzo isocyanide; 3-chlorobenzo isocyanide; 4-chlorobenzo isocyanide; o-toluyl isocyanide; m-toluyl isocyanide; p-toluyl isocyanide; phenyl isocyanide dichloride; 1,4-phenylene diisocyanide and the like.

Examples of thiocyanates useful herein as the internal electron donor are compounds containing at least one C—SCN thiocyanate group. Examples are saturated or unsaturated aliphatic, alicyclic, or aromatic compounds containing a thiocyanate group. Included within the thiocyanates are compounds containing heteroatoms, which are atoms other than carbon, selected from Groups 13, 14, 15, 16 and 17 of the Periodic Table of Elements. Examples of thiocyanates are methyl thiocyanate; ethyl thiocyanate; propyl thiocyanate; isopropyl thiocyanate; n-butyl thiocyanate; t-butyl thiocyanate; s-butyl thiocyanate; pentyl thiocyanate; hexyl thiocyanate; heptyl thiocyanate; octyl thiocyanate; nonyl thiocyanate; decyl thiocyanate; undecane thiocyanate; benzyl thiocyanate; phenyl thiocyanate; 4'-bromophenyacyl thiocyanate; 2-methylbenzyl thiocyanate; 2-chlorobenzo thiocyanate; 3-chlorobenzo thiocyanate; 4-chlorobenzo thiocyanate; o-toluyl thiocyanate; m-toluyl thiocyanate; p-toluyl thiocyanate and the like.

Examples of isothiocyanates useful herein as the internal electron donor are compounds containing at least one C—NCS isothiocyanate group. Examples are saturated or unsaturated aliphatic, alicyclic, or aromatic compounds containing a isothiocyanate group. Included within the isothiocyanates are compounds containing heteroatoms, which are atoms other than carbon, selected from Groups 13, 14, 15, 16 and 17 of the Periodic Table of Elements. Examples of isothiocyanates are methyl isothiocyanate; ethyl isothiocyanate; propyl isothiocyanate; isopropyl isothiocyanate; n-butyl isothiocyanate; t-butyl isothiocyanate; s-butyl isothiocyanate; pentyl isothiocyanate; hexyl isothiocyanate; heptyl isothiocyanate; octyl isothiocyanate; nonyl isothiocyanate; decyl isothiocyanate; undecane isothiocyanate; phenyl isothiocyanate; benzyl isothiocyanate; phenethyl isothiocyanate; o-tolyl isothiocyanate; 2-fluorophenyl isothiocyanate; 3-fluorophenyl isothiocyanate; 4-fluorophenyl isothiocyanate; 2-nitrophenyl isothiocyanate; 3-nitrophenyl isothiocyanate; 4-nitrophenyl isothiocyanate; 2-chlorophenyl isothiocyanate; 2-bromophenyl isothiocyanate; 3-chlorophenyl isothiocyanate; 3-bromophenyl isothiocyanate; 4-chlorophenyl isothiocyanate; 2,4-dichlorophenyl isothiocyanate; R-(+)-alpha-methylbenzyl isothiocyanate; S-(–)-alpha-methylbenzyl isothiocyanate; 3-isoprenyl-alpha,alpha-dimethylbenzyl isothiocyanate; trans-2-phenylcyclopropyl isothiocyanate; 1,3-bis(isocyanatomethyl)-benzene; 1,3-bis(1-isocyanato-1-methylethyl)benzene; 2-ethylphenyl isothiocyanate; benzoyl isothiocyanate; 1-naphthyl isothiocyanate; benzoyl isothiocyanate; 4-bromophenyl isothiocyanate; 2-methoxyphenyl isothiocyanate; m-tolyl isothiocyanate; alpha, alpha, alpha-trifluoro-m-tolyl isothiocyanate; 3-fluorophenyl isothiocyanate; 3-chlorophenyl isothiocyanate; 3-bromophenyl isothiocyanate; 1,4-phenylene diisothiocyanate; 1-isothiocyanato-4-(trans-4-propylcyclohexyl) benzene; 1-(trans-4-hexylcyclohexyl)-4-isothiocyanatobenzene; 1-isothiocyanato-4-(trans-4-octylcyclohexyl) benzene; 2-methylbenzyl isothiocyanate; 2-chlorobenzo isothiocyanate; 3-chlorobenzo isothiocyanate; 4-chlorobenzo isothiocyanate; m-toluyl isothiocyanate; p-toluyl isothiocyanate and the like.

Examples of sulfoxides useful herein as the internal electron donor are compounds containing at least one C—S(=O)—C sulfoxo group. Examples are saturated or unsaturated aliphatic, alicyclic, or aromatic compounds containing a sulfoxo group. Included within the sulfoxides are compounds containing heteroatoms, which are atoms other than carbon, selected from Groups 13, 14, 15, 16 and 17 of the Periodic Table of Elements. Examples of sulfoxides are methyl sulfoxide; ethylsulfoxide; propylsulfoxide; butyl sulfoxide; pentyl sulfoxide; hexyl sulfoxide; heptyl sulfoxide; octyl sulfoxide; nonyl sulfoxide; decyl sulfoxide; phenyl sulfoxide; p-tolyl sulfoxide; m-tolyl sulfoxide; o-tolyl sulfoxide; methyl phenyl sulfoxide; (R)-(+)-methyl p-tolyl sulfoxide; (S)-(–)-methyl phenyl sulfoxide; phenyl vinyl sulfoxide; 4-chlorophenyl sulfoxide; methyl (phenylsulfinyl) acetate; benzyl sulfoxide; tetramethylene sulfoxide; methyl methylsulfinylmethyl sulfide; dl-methionine sulfoxide; dl-methionine sulfoximine and the like.

Examples of sulfones useful herein as the internal electron donor are compounds containing at least one C—S(=O)$_2$—C sulfone group. Examples are saturated or unsaturated aliphatic, alicyclic, or aromatic compounds containing a sulfone group. Included within the sulfones are compounds containing heteroatoms, which are atoms other than carbon, selected from Groups 13, 14, 15, 16 and 17 of the Periodic Table of Elements. Examples of sulfones are methyl sulfone; ethyl sulfone; propyl sulfone; butyl sulfone; methyl vinyl sulfone; ethyl vinyl sulfone; divinyl sulfone; phenyl vinyl sulfone; allyl phenyl sulfone; cis-1,2-bis(phenylsulfonyl)ethylene; 2-(phenylsulfonyl)tetrahydropyran; chloromethyl phenyl sulfone; bromomethyl phenyl sulfone; phenyl tribromomethyl sulfone; 2-chloroethyl phenyl sulfone; methylthiomethyl phenyl sulfone; (phenylsulfonyl)acetonitrile; chloromethyl p-tolyl sulfone; N, N-bis(p-tolylsulfonylmethyl)-ethylamine; methylthiomethyl p-tolyl sulfone; 2-(phenylsulfonyl)acetophenone; methyl phenylsulfonylacetate; 4-fluorophenyl methyl sulfone; 4-chlorophenyl 2-chloro-1,1,2-trifluoroethyl sulfone; tosylmethyl isocyanide; phenyl sulfone; benzyl sulfone; phenyl trans-styryl sulfone; 1-methyl-2-((phenylsulfonyl)methyl)-benzene; 1-bromomethyl-2-((phenylsulfonyl)-methyl)benzene; p-tolyl sulfone; bis(phenylsulfonyl)methane; 4-chlorophenyl phenyl sulfone; 4-fluorophenyl sulfone; 4-chlorophenyl sulfone; 4,4'-sulfonylbis(methyl benzoate); 9-oxo-9H-thioxanthene-3-carbonitrile 10,10-dioxide; tetramethylene sulfone; 3-methylsulfolane; 2,4-dimethylsulfolane; trans-3,4-dichlorotetrahydrothiophene 1,1-dioxide; trans-3,4-dibromotetrahydrothiophene 1,1-dioxide; 3,4-epoxytetrahydrothiophene-1,1-dioxide; butadiene sulfone; 3-ethyl-2,5-dihydrothiophene-1,1-dioxide and the like.

Examples of phosphorous compounds useful herein as the internal electron donor are saturated or unsaturated aliphatic, alicyclic, or aromatic phosphorous compounds having 2 to 50 carbon atoms containing at least one phosphorous atom. Included within the phosphorous compounds are compounds containing heteroatoms, which are atoms other than carbon, selected from Groups 13, 14, 15, 16 and 17 of the Periodic Table of Elements. Examples of phosphorous compounds are trimethylphosphine; triethylphosphine; trimethyl phosphite; triethyl phosphite; hexamethylphosphorus triamide; hexamethylphosphoramide; tripiperidinophosphine oxide; triphenylphosphine; tri-p-tolylphosphine; tri-m-tolylphosphine; tri-o-tolylphosphine; methyldiphenylphosphine; ethyldiphenylphosphine; isopropyldiphenylphosphine; allyldiphenylphosphine; cyclohexyldiphenylphosphine; benzyldiphenylphosphine; di-tert-butyl dimethylphosphoramidite; di-tert-butyl diethylphosphoramidite; di-tert-butyl diisopropylphosphoramidite; diallyl diisopropylphosphoramidite and the like.

Examples of organosilicon compounds useful herein as the internal electron donor are saturated or unsaturated aliphatic, alicyclic, or aromatic organosilicon compounds having 2 to 50 carbon atoms containing at least one oxygen atom. Included within the organosilicon compounds are compounds containing heteroatoms, which are atoms other than carbon, selected from Groups 13, 14, 15, 16 and 17 of the Periodic Table of Elements. Examples of organosilicon compounds are tetramethyl orthosilicate; tetraethyl orthosilicate; tetrapropyl orthosilicate; tetrabutyl orthosilicate; trichloromethoxysilane; trichloroethoxysilane; trichloropropoxysilane; trichloroisopropoxysilane; trichlorobutoxysilane; trichloroisobutoxysilane; dichlorodimethoxysilane; dichlorodiethoxysilane; dichlorodipropoxysilane; dichlorodiisopropoxysilane; dichlorodibutoxysilane; dichlorodiisobutoxysilane; chlorotrimethoxysilane; chlorotriethoxysilane; chlorotripropoxysilane; chlorotriisopropoxysilane; chlorotributoxysilane; chlorotriisobutoxysilane; dimethylmethoxysilane; diethylmethoxysilane; dipropylmethoxysilane; diisopropylmethoxysilane; dibutylmethoxysilane; diisobutylmethoxysilane; dipentylmethoxysilane; dicyclopentylmethoxysilane; dihexylmethoxysilane; dicyclohexylmethoxysilane; diphenylmethoxysilane; dimethylethoxysilane; diethylethoxysilane; dipropylethoxysilane; diisopropylethoxysilane; dibutylethoxysilane; diisobutylethoxysilane; dipentylethoxysilane; dicyclopentylethoxysilane; dihexylethoxysilane; dicyclohexylethoxysilane; diphenylethoxysilane; trimethylmethoxysilane; triethylmethoxysilane; tripropylmethoxysilane; triisopropylmethoxysilane; tributylmethoxysilane; triisobutylmethoxysilane; tripentylmethoxysilane; tricyclopentylmethoxysilane; trihexylmethoxysilane; tricyclohexylmethoxysilane; triphenylmethoxysilane; trimethylethoxysilane; triethylethoxysilane; tripropylethoxysilane; triisopropylethoxysilane; tributylethoxysilane; triisobutylethoxysilane; tripentylethoxysilane; tricyclopentylethoxysilane; trihexylethoxysilane; tricyclohexylethoxysilane; triphenylethoxysilane; dimethyidimethoxysilane; diethyidimethoxysilane; dipropyldimethoxysilane; diisopropyidimethoxysilane; dibutyldimethoxysilane; diisobutyldimethoxysilane; dipentyidimethoxysilane; dicyclopentyidimethoxysilane; dihexyldimethoxysilane; dicyclohexyldimethoxysilane; diphenyidimethoxysilane;

dimethyldiethoxysilane; diethyldiethoxysilane; dipropyldiethoxysilane; diisopropyldiethoxysilane; dibutyldiethoxysilane; diisobutyldiethoxysilane; dipentyldiethoxysilane; dicyclopentyldiethoxysilane; dihexyldiethoxysilane; dicyclohexyldiethoxysilane; diphenyldiethoxysilane; cyclopentylmethyldimethoxysilane; cyclopentylethyidimethoxysilane; cyclopentylpropyidimethoxysilane; cyclopentylmethyldiethoxysilane; cyclopentylethyldiethoxysilane; cyclopentylpropyldiethoxysilane; cyclohexylmethyldimethoxysilane; cyclohexylethyidimethoxysilane; cyclohexylpropyldimethoxysilane; cyclohexylmethyldiethoxysilane; cyclohexylethyidiethoxysilane; cyclohexylpropyldiethoxysilane; methyltrimethoxysilane; ethyltrimethoxysilane; vinyltrimethoxysilane; propyltrimethoxysilane; isopropyltrimethoxysilane; butyltrimethoxysilane; isobutyltrimethoxysilane; tert-butyltrimethoxysilane; phenyltrimethoxysilane; norbornanetrimethoxysilane; methyltriethoxysilane; ethyltriethoxysilane; vinyltriethoxysilane; propyltriethoxysilane; isopropyltriethoxysilane; butyltriethoxysilane; isobutyltriethoxysilane; tert-butyltriethoxysilane; phenyltriethoxysilane; norbomanetriethoxysilane; 2,3-dimethyl-2-(trimethoxysilyl)butane; 2,3-dimethyl-2-(triethoxysilyl)butane; 2,3-dimethyl-2-(tripropoxysilyl)butane; 2,3-dimethyl-2-(triisopropoxysilyl)butane; 2,3-dimethyl-2-(trimethoxysilyl)pentane; 2,3-dimethyl-2-(triethoxysilyl)pentane; 2,3-dimethyl-2-(tripropoxysilyl)pentane; 2,3-dimethyl-2-(triisopropoxysilyl)pentane; 2-methyl-3-ethyl-2-(trimethoxysilyl)pentane; 2-methyl-3-ethyl-2-(triethoxysilyl)pentane; 2-methyl-3-ethyl-2-(tripropoxysilyl)pentane; 2-methyl-3-ethyl-2-(triisopropoxysilyl)pentane; 2,3,4-trimethyl-2-(trimethoxysilyl)pentane; 2,3,4-trimethyl-2-(triethoxysilyl)pentane; 2,3,4-trimethyl-2-(tripropoxysilyl)pentane; 2,3,4-trimethyl-2-(triisopropoxysilyl)pentane; 2,3-dimethyl-2-(trimethoxysilyl)hexane; 2,3-dimethyl-2-(triethoxysilyl)hexane; 2,3-dimethyl-2-(tripropoxysilyl)hexane; 2,3-dimethyl-2-(triisopropoxysilyl)hexane; 2,4-dimethyl-3-ethyl-2-(trimethoxysilyl)pentane; 2,4-dimethyl-3-ethyl-2-(triethoxysilyl)pentane; 2,4-dimethyl-3-ethyl-2-(tripropoxysilyl)pentane; 2,4-dimethyl-3-ethyl-2-(triisopropoxysilyl)pentane; 2,4-dimethyl-3-isopropyl-2-(trimethoxysilyl)pentane; 2,4-dimethyl-3-isopropyl-2-(triethoxysilyl)pentane; 2,4-dimethyl-3-isopropyl-2-(tripropoxysilyl)pentane; 2,4-dimethyl-3-isopropyl-2-(triisopropoxysilyl)pentane; hexamethyldisiloxane; 1,1,1,3,3,3-hexamethyldisilazane and the like.

The present invention also provides a catalyst system comprising (A) at least one solid procatalyst as described above; and
(B) at least one cocatalyst The solid procatalyst may or may not include an internal electron donor, as described herein.

The molar ratio of the cocatalyst to the transition metal in the solid procatalyst preferably is from about 0.1 to about 1000. Preferably, the molar ratio of the cocatalyst to the transition metal in the solid procatalyst is from about 1 to about 250. Most preferably, the molar ratio of the cocatalyst to the transition metal in the solid procatalyst is from about 5 to about 100.

The at least one cocatalyst used in the present invention can be any organometallic compound, or mixtures thereof, that can activate the solid procatalyst in the polymerization or interpolymerization of olefins. For example, the cocatalyst component may contain an element of Groups 1, 2, 11, 12, 13 and/or 14 of the above-referenced Periodic Table of the Elements. Examples of such elements are lithium, magnesium, copper, zinc, boron, aluminum, silicon, tin and the like.

Preferably, the cocatalyst is at least one compound of the empirical formula,

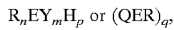

or mixtures thereof,
wherein,
each R is independently a hydrocarbyl group,
E is selected from the group consisting of boron, aluminum, gallium, and indium,
each Y is independently a monoanionic, monodentate ligand;
Q is selected from the group consisting of —O—, —S—, —N(R)—, —N(OR)—, —N(SR)—, —N(NR$_2$)—, —N(PR$_2$)—, —P(R)—, —P(OR)—, —P(SR)—, and —P(NR$_2$)—;
n>0, m≧0, p≧0, n+m+p=3; and q≧1.

The term "hydrocarbyl group", as used herein, denotes a monovalent, linear, branched, cyclic, or polycyclic group which contains carbon and hydrogen atoms. The hydrocarbyl group may optionally contain atoms in addition to carbon and hydrogen selected from Groups 13, 14, 15, 16, and 17 of the Periodic Table. Examples of monovalent hydrocarbyls include the following: $C_1$–$C_{30}$ alkyl; $C_1$–$C_{30}$ alkyl substituted with one or more groups selected from $C_1$–$C_{30}$ alkyl, $C_3$–$C_{15}$ cycloalkyl or aryl; $C_3$–$C_{15}$ cycloalkyl; $C_3$–$C_{15}$ cycloalkyl substituted with one or more groups selected from $C_1$–$C_{20}$ alkyl, $C_3$–$C_{15}$ cycloalkyl or aryl; $C_6$–$C_{15}$ aryl; and $C_6$–$C_{15}$ aryl substituted with one or more groups selected from $C_1$–$C_{30}$ alkyl, $C_3$–$C_{15}$ cycloalkyl or aryl; where aryl preferably denotes a substituted or unsubstituted phenyl, napthyl, or anthracenyl group.

Examples of the monoanionic, monodentate ligand Y include the halides, —OR, —OBR$_2$, —OSR, —ONR$_2$, —OPR$_2$, —NR$_2$, —N(R)BR$_2$, —N(R)OR, —N(R)SR, —N(R)NR$_2$, —N(R)PR$_2$, —N(BR$_2$)$_2$, —N=CR$_2$, —N=NR, —N=PR, —SR, —SBR$_2$, —SOR, —SNR$_2$, —SPR$_2$, —PR$_2$, and the like. Each R is independently a hydrocarbyl group, as defined above. Examples of halides are fluoride, chloride, bromide, and iodide.

Examples of alkoxides are methoxide, ethoxide, n-propoxide, i-propoxide, cyclopropyloxide, n-butoxide, i-butoxide, s-butoxide, t-butoxide, cyclobutyloxide, n-amyloxide, i-amyloxide, s-amyloxide, t-amyloxide, neopentoxide, cyclopentyloxide, n-hexoxide, cyclohexyloxide, heptoxide, octoxide, nonoxide, decoxide, undecoxide, dodecoxide, 2-ethyl hexoxide, phenoxide, 2,6-dimethylphenoxide, 2,6-di-i-propylphenoxide, 2,6-diphenylphenoxide, 2,6-dimesitylphenoxide, 2,4,6-trimethylphenoxide, 2,4,6-tri-i-propylphenoxide, 2,4,6-triphenylphenoxide, 2,4,6-trimesitylphenoxide, benzyloxide, menthoxide, and the like, halogenated alkoxides such as trifluoromethoxide, trifluoroethoxide, trifluoro-i-propoxide, hexafluoro-i-propoxide, heptafluoro-i-propoxide, trifluoro-t-butoxide, hexafluoro-t-butoxide, trifluoromethoxide, trichloroethoxide, trichloro-i-propoxide, and the like.

Examples of thiolates are methylthiolate, ethylthiolate, n-propylthiolate, i-propylthiolate, cyclopropylthiolate, n-butylthiolate, i-butylthiolate, s-butylthiolate, t-butylthiolate, cyclobutylthiolate, n-amylthiolate, i-amylthiolate, s-amylthiolate, t-amylthiolate, neopentylthiolate, cyclopentylthiolate, n-hexylthiolate, cyclohexylthiolate, phenylthiolate, 2,6-dimethylphenylthiolate, 2,6-di-i-propylphenylthiolate, 2,6-diphenylphenylthiolate, 2,6-dimesitylphenylthiolate, 2,4,6-trimethylphenylthiolate, 2,4,6-tri-i-propylphenylthiolate, 2,4,6-triphenylphenylthiolate, 2,4,6- trimesitylphenylthiolate, benzylthiolate, heptylthiolate, octylthiolate, nonylthiolate, decylthiolate, undecylthiolate, dodecylthiolate, 2-ethyl hexylthiolate, menthylthiolate, and the like, halogenated alkylthiolates such as trifluoromethylthiolate, trifluoroethylthiolate, trifluoro-i-propylthiolate, hexafluoro-i-propylthiolate, heptafluoro-i-propylthiolate, trifluorot-butylthiolate, hexafluoro-t-butylthiolate, trifluoromethylthiolate, trichloroethylthiolate, trichloro-i-propylthiolate, and the like.

Examples of amides are dimethylamide, diethylamide, di-n-propylamide, di-i-propylamide, dicyclopropylamide, di-n-butylamide, di-i-butylamide, di-s-butylamide, di-t-butylamide, dicyclobutylamide, di-n-amylamide, di-i-amylamide, di-s-amylamide, di-t-amylamide, dicyclopentylamide, dineopentylamide, di-n-hexylamide, dicyclohexylamide, diheptylamide, dioctylamide, di-nonylamide, didecylamide, diundecylamide, didodecylamide, di-2-ethyl hexylamide, diphenylamide, bis-2,6-dimethylphenylamide, bis-2,6-di-i-propylphenylamide, bis-2,6-diphenylphenylamide, bis-2,6-dimesitylphenylamide, bis-2,4,6-trimethylphenylamide, bis-2,4,6-tri-i-propylphenylamide, bis-2,4,6-triphenylphenylamide, bis-2,4,6-trimesitylphenylamide, dibenzylamide, dihexylamide, dicyclohexylamide, dioctylamide, didecylamide, dioctadecylamide, diphenylamide, dibenzylamide, bis-2,6-dimethylphenylamide, 2,6-bis-i-propylphenylamide, bis-2,6-diphenylphenylamide, diallylamide, di-propenylamide, N-methylanilide; N-ethylanilide; N-propylanilide; N-i-propylanilide; N-butylanilide; N-i-butylanilide; N-amylanilide; N-i-amylanilide; N-octylanilide; N-cyclohexylanilide; and the like, silyl amides such as bis(trimethylsilyl)amide, bis(triethylsilyl)amide, bis(dimethylphenylsilyl)amide, bis(t-butyldimethylsilyl)amide, bis(t-butyidiphenylsilyl)amide, phenyl(trimethylsilyl)amide, phenyl(triethylsilyl)amide, phenyl(trimethylsilyl)amide, methyl(trimethylsilyl)amide, ethyl(trimethylsilyl)amide, n-propyl(trimethylsilyl)amide, i-propyl(trimethylsilyl)amide, cyclopropyl(trimethylsilyl)amide, n-butyl(trimethylsilyl)amide, i-butyl(trimethylsilyl)amide, s-butyl(trimethylsilyl)amide, t-butyl(trimethylsilyl)amide, cyclobutyl(trimethylsilyl)amide, n-amyl(trimethylsilyl)amide, i-amyl(trimethylsilyl)amide, s-amyl(trimethylsilyl)amide, t-amyl(trimethylsilyl)amide, neopentyl(trimethylsilyl)amide, cyclopentyl(trimethylsilyl)amide, n-hexyl(trimethylsilyl)amide, cyclohexyl(trimethylsilyl)amide, heptyl(trimethylsilyl)amide and tri-ethylsilyl trimethylsilylamide, and the like, heterocyclic amides such as the conjugate bases of pyrrole, pyrrolidine, piperidine, piperazine, indole, imidazole, azole, thiazole, purine, phthalimide, azacycloheptane, azacyclooctane, azacyclononane, azacyclodecane, their substituted derivatives, and the like.

Examples of phosphides are dimethylphosphide, diethylphosphide, dipropylphosphide, dibutylphosphide, diamylphosphide, dihexylphosphide, dicyclohexylphosphide, diphenylphosphide, dibenzylphosphide, bis-2,6-dimethylphenylphosphide, 2,6-di-i-propylphenylphosphide, 2,6-diphenylphenylphosphide, and the like, the conjugate bases of cyclic phosphines such as phosphacyclopentane, phosphacyclohexane, phosphacycloheptane, phosphacyclooctane, phosphacyclononane, phosphacyclodecane, and the like.

Preferred for use herein as the monoanionic, monodentate ligand Y are fluoride, chloride, bromide, methoxide, ethoxide, n-propoxide, i-propoxide, butoxide, neopentoxide, benzyloxide, trifluoromethoxide, and trifluoroethoxide.

Mixtures of monoanionic, monodentate ligands Y may be used as the monoanionic, monodentate ligand Y.

Examples of the cocatalysts useful in the process of the present invention where E is boron in the formula $R_nEY_mH_p$ include trimethylborane; triethylborane; tri-n-propylborane; tri-n-butylborane; tri-n-pentylborane; triisoprenylborane; tri-n-hexylborane; tri-n-heptylborane; tri-n-octylborane; triisopropylborane; triisobutylborane; tris(cylcohexylmethyl)borane; triphenylborane; tris(pentafluorophenyl)borane; dimethylborane; diethylborane; di-n-propylborane; di-n-butylborane; di-n-pentylborane; diisoprenylborane; di-n-hexylborane; di-n-heptylborane; di-n-octylborane; diisopropylborane; diisobutylborane; bis(cylcohexylmethyl)borane diphenylborane; bis(pentafluorophenyl)borane; dimethylboron chloride; diethylboron chloride; di-n-propylboron chloride; di-n-butylboron chloride; di-n-pentylboron chloride; diisoprenylboron chloride; di-n-hexylboron chloride; di-n-heptylboron chloride; di-n-octylboron chloride; diisopropylboron chloride; diisobutylboron chloride; bis(cylcohexylmethyl)boron chloride; diphenylboron chloride; bis(pentafluorophenyl)boron chloride; diethylboron fluoride; diethylboron bromide; diethylboron iodide; dimethylboron methoxide; dimethylboron ethoxide; diethylboron ethoxide; dimethylboron methoxide; dimethylboron ethoxide; diethylboron ethoxide; methylboron dichloride; ethylboron dichloride; n-propylboron dichloride; n-butylboron dichloride; n-pentylboron dichloride; isoprenylboron dichloride; n-hexylboron dichloride; n-heptylboron dichloride; n-octylboron dichloride; isopropylboron dichloride; isobutylboron dichloride; (cylcohexylmethyl)boron dichloride; phenylboron dichloride; pentafluorophenylboron dichloride; chloromethylboron methoxide; chloromethylboron ethoxide; chloroethylboron ethoxide and the like.

Examples of the cocatalysts useful in the process of the present invention where E is aluminum in the formula $R_nEY_mH_p$ include trimethylaluminum; triethylaluminum; tri-n-propylaluminum; tri-n-butylaluminum; tri-n-pentylaluminum; trisoprenylaluminum; tri-n-hexylaluminum; tri-n-heptylaluminum; tri-n-octylaluminum; triisopropylaluminum; triisobutylaluminum; tris(cylcohexylmethyl)aluminum; dimethylaluminum hydride; diethylaluminum hydride; di-n-propylaluminum hydride; di-n-butylaluminum hydride; di-n-pentylaluminum hydride; diisoprenylaluminum hydride; di-n-hexylaluminum hydride; di-n-heptylaluminum hydride; di-n-octylaluminum hydride; diisopropylaluminum hydride; diisobutylaluminum hydride; bis(cylcohexylmethyl)aluminum hydride; dimethylaluminum chloride; diethylaluminum chloride; di-n-propylaluminum chloride; di-n-butylaluminum chloride; di-n-pentylaluminum chloride; diisoprenylaluminum chloride; di-n-hexylaluminum chloride; di-n-heptylaluminum chloride; di-n-octylaluminum chloride; diisopropylaluminum chloride; diisobutylaluminum chloride; bis(cylcohexylmethyl)aluminum chloride; diethylaluminum fluoride; diethylaluminum bromide; diethylaluminum iodide; dimethylaluminum methoxide; dimethylaluminum ethoxide; diethylaluminum ethoxide; methylaluminum dichloride; ethylaluminum dichloride; n-propylaluminum dichloride; n-butylaluminum dichloride; n-pentylaluminum dichloride; isoprenylaluminum dichloride; n-hexylaluminum dichloride; n-heptylaluminum dichloride; n-octylaluminum dichloride; isopropylaluminum dichloride; isobutylaluminum dichloride; (cylcohexylmethyl)aluminum dichloride; chloromethylaluminum methoxide; chloromethylaluminum ethoxide; chloroethylaluminum ethoxide and the like.

Other examples of suitable cocatalysts include the alumoxanes, especially methylalumoxane. Other examples of suitable cocatalysts of empirical formula $(QER)_q$ include alumimines.

Preferred for use herein as cocatalysts are trialkylaluminums such as trimethylaluminum, triethylaluminum, tri-n-propylaluminum, tri-n-butylaluminum, triisobutylaluminum, tri-n-hexylaluminum, triisohexylaluminum, tri-2methylpentylaluminum, tri-n-octylaluminum, tri-n-decylaluminum; and dialkylaluminum halides such as dimethylaluminum chloride, diethylaluminum chloride, dibutylaluminum chloride, diisobutylaluminum chloride, diethylaluminum bromide and diethylaluminum iodide; and alkylaluminum sesquihalides such as methylaluminum sesquichloride, ethylaluminum sesquichloride, n-butylaluminum sesquichloride, isobutylaluminum sesquichloride, ethylaluminum sesquifluoride, ethylaluminum sesquibromide and ethylaluminum sesquiiodide.

Most preferred for use herein as cocatalysts are trialkylaluminums such as trimethylaluminum, triethylaluminum, tri-n-propylaluminum, triisobutylaluminum, tri-n-octylaluminum and dialkylaluminum halides such as dimethylaluminum chloride, diethylaluminum chloride, diisobutylaluminum chloride and alkylaluminum sesquihalides such as methylaluminum sesquichloride, and ethylaluminum sesquichloride.

Mixtures of the above cocatalysts can also be utilized herein as the cocatalyst.

In a further aspect of the invention, there is provided a process for polymerizing or interpolymerizing olefins using the catalyst systems of the invention, which comprise a solid procatalyst and a cocatalyst as set forth herein.

Preferably, the present invention provides a process for polymerizing ethylene and/or interpolymerizing ethylene and at least one or more other olefin(s) comprising contacting, under polymerization conditions, the ethylene and/or ethylene and at least one or more olefin(s) with the catalyst system of the present invention.

The polymerization or interpolymerization process of the present invention may be carried out using any conventional process. For example, there may be utilized polymerization or interpolymerization in suspension, in solution, in supercritical fluid or in gas phase media. All of these polymerization or interpolymerization processes are well known in the art.

A particularly desirable method for producing polyethylene polymers and interpolymers according to the present invention is a gas phase polymerization process preferably utilizing a fluidized bed reactor. This type reactor and means for operating the reactor are well known and completely described in U.S. Pat. Nos. 3,709,853; 4,003,712; 4,011,382; 4,012,573; 4,302,566; 4,543,399; 4,882,400; 5,352,749; 5,541,270; Canadian Patent No. 991,798 and Belgian Patent No. 839,380. These patents disclose gas phase polymerization processes wherein the polymerization medium is either mechanically agitated or fluidized by the continuous flow of the gaseous monomer and diluent. The entire contents of these patents are incorporated herein by reference.

In general, the polymerization process of the present invention may be effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

In more detail, the reactor temperature of the fluid bed process herein ranges from about 30° C. to about 110° C. In general, the reactor temperature is operated at the highest temperature that is feasible taking into account the sintering temperature of the polymer product within the reactor.

The process of the present invention is suitable for the production of polymers of olefins and/or interpolymers of olefins and at least one or more other olefins. Preferably, the process of the present invention is suitable for the production of polymers of ethylene and/or interpolymers of ethylene and at least one or more other olefins. Preferably the olefins are alpha-olefins. The olefins, for example, may contain from 2 to 16 carbon atoms. Particularly preferred for preparation herein by the process of the present invention are linear polyethylene polymers and interpolymers. Such linear polyethylene polymers or interpolymers are preferably linear homopolymers of ethylene and linear interpolymers of ethylene and at least one alpha-olefin wherein the ethylene content is at least about 50% by weight of the total monomers involved. Examples of alpha-olefins that may be utilized herein are propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization or interpolymerization medium. When olefins are formed in situ in the polymerization or interpolymerization medium, the formation of linear polyethylene polymers or interpolymers containing long chain branching may occur.

Examples of the polymers or interpolymers that can be produced by the process of the present invention include polymers of ethylene and interpolymers of ethylene and at least one or more alpha-olefins having 3 to 16 carbon atoms wherein ethylene comprises at least about 50% by weight of the total monomers involved.

The olefin polymers or interpolymers of the present invention may be fabricated into films by any technique known in the art. For example, films may be produced by the well known cast film, blown film and extrusion coating techniques.

Further, the olefin polymers or interpolymers may be fabricated into other articles of manufacture, such as molded articles, by any of the well known techniques.

In the process of the invention, the solid procatalyst, cocatalyst, or catalyst system can be introduced in any manner known in the art. For example, the solid procatalyst can be introduced directly into the polymerization or interpolymerization medium in the form of a slurry or a dry free flowing powder. The solid procatalyst can also be used in the form of a prepolymer obtained by contacting the solid procatalyst with one or more olefins in the presence of a cocatalyst.

The molecular weight of the olefin polymers or interpolymers produced by the present invention can be controlled in any known manner, for example, by using hydrogen. The molecular weight control may be evidenced by an increase in the melt index ($I_2$) of the polymer or interpolymer when the molar ratio of hydrogen to ethylene in the polymerization or interpolymerization medium is increased.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the analytical and physical properties of the polymers herein.

a) The molecular weight distribution (MWD), the ratio of $M_w/M_n$, of the ethylene/olefin interpolymers are determined with a Waters Gel Permeation Chromatograph Series 150 equipped with Ultrastyrogel columns and a refractive index detector. The operating temperature of the instrument was set at 140° C., the eluting solvent was o-dichlorobenzene, and the calibration standards included 10 polystyrenes of precisely known molecular weight, ranging from a molecular weight of 1000 to a molecular weight of 1.3 million, and a polyethylene standard, NBS 1475;

b) Melt Index (MI), $I_2$, is determined in accord with ASTM D-1238, condition E, measured at 190° C., and reported as decigrams per minute;

c) High Load Melt Index (HLMI), $I_{21}$, is measured in accord with ASTM D-1238, Condition F, measured at 10.0 times the weight used in the melt index test above;

d) Melt Flow Ratio (MFR)=$I_{21}/I_2$ or High Load Melt Index/Melt Index.

Examples 1–21 were carried out in a nitrogen-filled Vacuum Atmospheres He-43-2 glove box. Solvents and hexene were purified by passage through a bed of activated alumina followed by passage through a bed of BASF R-311 copper catalyst under 172 kPa (25 psi) nitrogen pressure prior to entering the glove box. Ethylene and hydrogen were purified by passage through a bed of BASF R-311 copper catalyst prior to entering the glove box. Solvents and gases are introduced into the glove box using 3.2 mm (⅛ inch) steel tubing terminating with ball valves. All other reagents were obtained from commercial sources and used as received. In examples 2, 4, and 8–21, there was utilized Sylopol™ 5550 support from Grace Davison.

Example 1 (comparative)

A solution of 237 mg of (Me$_3$C(N-2,6-(CHMe$_2$)$_2$—C$_6$H$_3$)$_2$)AlEt$_2$ in 2 mL toluene was added to a solution of 0.0258 mL of TiCl$_4$ in 3.0 mL toluene with stirring. The resulting solution was stirred for 120 seconds.

Example 2

A solution of 237 mg of (Me$_3$C(N-2,6-(CHMe$_2$)$_2$—C$_6$H$_3$)$_2$)AlEt$_2$ in 2 mL toluene was added to a solution of 0.0258 mL of TiCl$_4$ in 3.0 mL toluene with stirring. The resulting solution was stirred for 120 seconds. 1.0 mL of the resulting solution was added to a stirred slurry of 500 mg Sylopol™ 5550 support in 6.0 mL toluene. The resulting slurry was stirred for 30 minutes and filtered using a fritted glass funnel. The solid procatalyst powder was then washed with pentane and dried in vacuo for 30 minutes.

Example 3 (comparative)

A solution was prepared by adding to a solution of 0.090 mL Me$_3$Al in 4 mL toluene, 5 mL of a solution of 0.196 mL of 2,2,6,6-tetramethylheptanedione in toluene at a rate of 2–4 drops/sec. The resulting solution was stirred for 60 minutes. The resulting solution was then added to a 10 mL volumetric flask followed by addition of toluene to make a 10.0 mL solution.

0.0258 mL of TiCl$_4$ was added to 5.0 mL of the above solution with stirring. The resulting solution was stirred for 30 seconds.

Example 4

A solution was prepared by adding to a solution of 0.090 mL Me$_3$Al in 4 mL toluene, 5 mL of a solution of 0.196 mL of 2,2,6,6-tetramethylheptanedione in toluene at a rate of 2–4 drops/sec. The resulting solution was stirred for 60 minutes. The resulting solution was then added to a 10 mL volumetric flask followed by addition of toluene to make a 10.0 mL solution.

0.0258 mL of TiCl$_4$ was added to 5.0 mL of the above solution with stirring. The resulting solution was stirred for 30 seconds. 1.0 mL of the resulting solution was added to a stirred slurry of 500 mg Sylopol™ 5550 support in 6.0 mL toluene. The resulting slurry was stirred for 30 minutes and filtered using a fritted glass funnel. The solid procatalyst powder was then washed with pentane and dried in vacuo for 30 minutes.

Examples 5–10

In the following examples 5–10 the materials produced in examples 1–4 were utilized in carrying out polymerization reactions. The polymerization reactions were carried out in a 12 oz. Fischer-Porter aerosol reaction vessel. This is a bottle-type design using a rubber to glass sealing head. Installation of the reactor head provides a seal which will safely hold 690 kPa (100 psi). Heat is applied via a 1" wide heating tape wrapped around a stainless steel protective wire mesh screen. Gas or liquid monomers can be added through a multi-port addition head as desired. Pressures and volumes can all be maintained at the source prior to addition into the vessel.

Comparative Examples 5 and 8

In carrying out comparative examples 5 and 8, the following procedure was utilized. 0.0075 mL of trimethyl aluminum was added to a solution of 15 mL hexene in 100 mL heptane, and the resulting solution was heated to 90° C. The solution of either example 1 or 3 was then added and the reactor sealed. Excess pressure was vented from the reaction vessel. 55.2 kPa (8 psi) hydrogen pressure was added. Ethylene was added to give a total pressure of 662 kPa (96 psi), and this pressure was maintained for one hour by continuous ethylene feed. After this time, the reaction vessel pressure was vented and the vessel removed from the glove box. Approximately 300 mL of reagent grade acetone was added to the slurry and the slurry was cooled to room temperature. The slurry was mixed with a blender, filtered, and washed with acetone. The resulting powder was dried in a vacuum oven for at least four hours at 40–50° C.

Examples 6, 7, 9, and 10

In carrying out examples 6, 7, 9, and 10, the following procedure was utilized. 100 mL heptane was added to the reaction vessel. 1.0 mL of this heptane was added to the solid procatalyst of either example 2 or 4 to form a slurry, and 0.0075 mL of trimethyl aluminum was added. The resulting slurry was added to the reaction vessel. The vessel was sealed, and was heated to 90° C. Excess pressure was vented from the reaction vessel. 55.2 kPa (8 psi) hydrogen pressure was added. Hexene was added using ethylene pressure, giving a total pressure of 662 kPa (96 psi). This pressure was maintained for one hour by continuous ethylene feed. After this time, the reaction vessel pressure was vented and the vessel removed from the glove box. Approximately 300 mL of reagent grade acetone was added to the slurry and the slurry was cooled to room temperature. The slurry was mixed with a blender, filtered, and washed with acetone. The resulting powder was dried in a vacuum oven for at least four hours at 40–50° C.

Further details concerning examples 5–10 are reported in table 1.

1.0 mL of the resulting solution was added to a stirred slurry of 500 mg Sylopol™ 5550 support in 6.0 mL toluene. The resulting slurry was stirred for 30 minutes and filtered using a fritted glass funnel. The solid procatalyst powder was then washed with pentane and dried in vacuo for 30 minutes.

Example 12

A solution was prepared by adding to a solution of 0.0064 mL $Et_3Al$ in 15 mL toluene, 5 mL of a solution of 0.0065 g of 2-nitrophenol in toluene at a rate of 2–4 drops/sec. The resulting solution was stirred for 60 minutes. The resulting solution was then added to a 25 mL volumetric flask followed by addition of toluene to make a 25.0 mL solution.

5.0 mL of the above solution was added to a solution of 0.0052 mL $TiCl_4$ in 5.0 mL toluene. The resulting solution was stirred for 60 seconds. The resulting solution was added to a stirred slurry of 500 mg Sylopol™ 5550 support in 5 mL toluene. The resulting slurry was stirred for 30 minutes and filtered using a fritted glass funnel. The solid procatalyst powder was then washed with heptane and dried in vacuo.

Example 13

A solution of 63 mg $AlMe_2[Me_3C(NCHMe_2)_2]$ in 1 mL heptane was added to a solution of 0.0143 mL $TiCl_4$ in 20 mL heptane. The resulting solution was stirred for 120

TABLE 1

| | | | Polymerization data. | | | | | |
| --- | --- | --- | --- | --- | --- | --- | --- | --- |
| Example | Catalyst from Example | Amount of Catalyst | Polymer Yield (g) | Kg Polymer/ g Ti hr | Mg Polymer/ mol Ti hr | MWD Mw/Mn | Mn K | Mw K |
| 5 | 1 | 1.0 mL | 5.6 | 2.5 | 0.12 | 11.0 | 8.4 | 92 |
| 6 | 2 | 4.5 mg | 3.7 | 183 | 8.7 | 5.5 | 26.7 | 148 |
| 7 | 2 | 4.5 mg | 4.9 | 242 | 11.6 | 4.9 | 26.3 | 128 |
| 8 | 3 | 1.0 mL | 5.2 | 2.3 | 0.11 | 10.2 | 17.2 | 176 |
| 9 | 4 | 4.5 mg | 10.9 | 538 | 25.8 | 4.6 | 24.9 | 113 |
| 10 | 4 | 4.5 mg | 10.5 | 519 | 24.8 | 4.4 | 24.6 | 108 |

From the data above, it is observed that the activity (Kg Polymer/g Ti hr) resulting from the use of a supported solid procatalyst as compared to the activity resulting form the use of a soluble unsupported procatalyst is increased. Further, it is observed that the molecular weight distribution (Mw/Mn) of the polymer produced using a supported solid procatalyst as compared with the polymer produced using a soluble unsupported catalyst is decreased.

In the following Examples 11–21, there are described the preparation of additional solid procatalysts. It is expected that the solid procatalysts of Examples 11–21 can be used in the preparation of catalyst systems that will be useful in the polymerization and interpolymerization of olefins.

Example 11

A solution was prepared by adding to a solution of 0.090 mL $Me_3Al$ in 4 mL toluene, 5 mL of a solution of 0.196 mL of 2,2,6,6-tetramethylheptanedione in toluene at a rate of 2–4 drops/sec. The resulting solution was stirred for 60 minutes. The resulting solution was then added to a 10 mL volumetric flask followed by addition of toluene to make a 10.0 mL solution.

0.0258 mL of $TiCl_4$ was added to 5.0 mL of the above solution with stirring. The resulting solution was stirred for 30 seconds. To this solution was added 0.038 mL tetrahydrofuran. The resulting solution was stirred for 30 seconds.

seconds. The resulting solution was added to a stirred slurry of 2500 mg Sylopol™ 5550 support in 20 mL heptane. The resulting slurry was stirred for 20 minutes and filtered using a fritted glass funnel. The solid procatalyst powder was then washed with heptane and dried in vacuo.

Example 14

A solution of 75 mg $Et_2Al[(cyclo-C_7H_5-1,2-(NCHMe_2)_2]$ in 3 mL heptane was added to a solution of 0.0143 mL $TiCl_4$ in 15 mL heptane. The resulting solution was stirred for 120 seconds. The resulting solution was added to a stirred slurry of 2500 mg Sylopol™ 5550 support in 20 mL heptane. The resulting slurry was stirred for 20 minutes and filtered using a fritted glass funnel. The solid procatalyst powder was then washed with heptane and dried in vacuo.

Example 15

A solution of 131 mg $Et_2Al[(cyclo-C_7H_5-1,2-(NCHMe_2)_2]$ in 8 mL heptane was added to a solution of 0.0143 mL $TiCl_4$ in 10 mL heptane. The resulting solution was stirred for 120 seconds. The resulting solution was added to a stirred slurry of 2500 mg Sylopol™ 5550 support in 30 mL heptane. The resulting slurry was stirred for 30 minutes and filtered using a fritted glass funnel. The solid procatalyst powder was then washed with heptane and dried in vacuo.

Example 16

A solution of 70 mg $Me_2Al[Me_3CC(NCMe_3)_2]$ in 8 mL heptane was added to a solution of 0.0143 mL $TiCl_4$ in 60 mL heptane. The resulting solution was stirred for 120 seconds. The resulting solution was added to a stirred slurry of 2500 mg Sylopol™ 5550 support in 30 mL heptane. The resulting slurry was stirred for 30 minutes and filtered using a fritted glass funnel. The solid procatalyst powder was then washed with heptane and dried in vacuo.

Example 17

A solution of 35 mg $Me_2Al[Me_3CC(NCMe_3)_2]$ in 4 mL heptane was added to a solution of 0.0143 mL $TiCl_4$ in 14 mL heptane. The resulting solution was stirred for 120 seconds. The resulting solution was added to a stirred slurry of 2500 mg Sylopol™ 5550 support in 30 mL heptane. The resulting slurry was stirred for 30 minutes and filtered using a fritted glass funnel. The solid procatalyst powder was then washed with heptane and dried in vacuo.

Example 18

A solution of 131 mg $Et_2Al[Me_3CC(N-2,6-(CHMe_2)-C_6H_3)_2]$ in 10 mL heptane was added to a solution of 0.0143 mL $TiCl_4$ in 10 mL heptane. The resulting solution was stirred for 600 seconds. The resulting solution was added to a stirred slurry of 2500 mg Sylopol™ 5550 support in 20 mL heptane. The resulting slurry was stirred for 30 minutes and filtered using a fritted glass funnel. The solid procatalyst powder was then washed with heptane and dried in vacuo.

Example 19

A solution of 76 mg $Et_2Al[Me_3CC(N-2,6-(CHMe_2)-C_6H_3)_2]$ in 20 mL heptane was added to a solution of 0.0143 mL $TiCl_4$ in 10 mL heptane. The resulting solution was stirred for 120 seconds. The resulting solution was added to a stirred slurry of 2500 mg Sylopol™ 5550 support in 35 mL heptane. The resulting slurry was stirred for 30 minutes and filtered using a fritted glass funnel. The solid procatalyst powder was then washed with heptane and dried in vacuo.

Example 20

A solution of 44 mg $Me_2Al[O-[2-CH(N-2,6-(CHMe_2)]—C_6H_3)C_6H_3)_2]$ in 2 mL pentane was added to a solution of 0.0143 mL $TiCl_4$ in 18 mL pentane. The resulting solution was stirred for 300 seconds. The resulting solution was added to a stirred slurry of 2500 mg Sylopol™ 5550 support in 25 mL pentane. The resulting slurry was stirred for 30 minutes and filtered using a fritted glass funnel. The solid procatalyst powder was then washed with pentane and dried in vacuo.

Example 21

A solution of 33 mg $Me_2Al[O-[2-CH(NC_6H_5)]—C_6H_3)_2]$ in 3 mL pentane was added to a solution of 0.0143 mL $TiCl_4$ in 17 mL pentane. A precipitate forms which is redissolved by addition of 25 mL pentane and 4 mL toluene. The resulting solution was added to a stirred slurry of 2500 mg Sylopol™ 5550 support in 25 mL pentane. The resulting slurry was stirred for 30 minutes and filtered using a fritted glass funnel. The solid procatalyst powder was then washed with pentane and dried in vacuo.

It should be clearly understood that the forms of the invention herein described are illustrative only and are not intended to limit the scope of the invention. The present invention includes all modifications falling within the scope of the following claims.

I claim:

1. A solid procatalyst prepared by contacting
   i) a soluble species obtained by reacting at least one transition metal compound of empirical formula $MX_4$ wherein M is selected from the group consisting of titanium, zirconium, and hafnium, and X is a halogen selected from the group consisting of fluorine, chlorine, bromine, and iodine, with at least one alkylating agent of the formula $L_xER_nY_mH_p$, where each L is independently a monoanionic, bidentate ligand bound to E by two atoms selected from the group consisting of oxygen, sulfur, selenium, tellurium, nitrogen phosphorus, arsenic, antimony, and bismuth, or mixtures thereof, E is selected from the group consisting of boron, aluminum, gallium, and indium, each R is independently a hydrocarbyl group, each Y is independently a monoanionic, monodentate ligand, H is hydrogen, $0<x<2$, $n>0$, $m>0$, $p>0$ and $x+n+m+p=3$, and at least one internal electron donor in at least one aprotic solvent, with
   ii) a support.

2. A catalyst system comprising
   i) a solid procatalyst according to claim 1, and
   ii) at least one cocatalyst.

3. A process for polymerizing at least one or more olefin(s) comprising contacting, under polymerization conditions, at least one or more olefin(s) with a catalyst system according to claim 2.

* * * * *